United States Patent
Edwards et al.

(10) Patent No.: US 12,380,443 B1
(45) Date of Patent: Aug. 5, 2025

(54) CRYPTOCURRENCY STAKING VALIDATOR SYSTEM

(71) Applicant: Gemini IP, LLC, New York, NY (US)

(72) Inventors: Alex Edwards, Portland, OR (US); Jessica Destefano, Denver, CO (US); Christopher Karabats, Round Rock, TX (US); Mitchell McCuiston, Prosper, TX (US); Ioannis Papapanagiotou, San Jose, CA (US); Enrique Valenzuela, Chantilly, VA (US); Ahmad Wilson, Sandy Springs, GA (US)

(73) Assignee: Gemini IP, LLC, New York, NY (US)

( * ) Notice: Subject to any disclaimer, the term of this patent is extended or adjusted under 35 U.S.C. 154(b) by 138 days.

(21) Appl. No.: 18/371,969

(22) Filed: Sep. 22, 2023

Related U.S. Application Data

(60) Provisional application No. 63/409,945, filed on Sep. 26, 2022.

(51) Int. Cl.
*G06Q 20/38* (2012.01)
*G06Q 20/06* (2012.01)

(52) U.S. Cl.
CPC ..... *G06Q 20/3829* (2013.01); *G06Q 20/0658* (2013.01)

(58) Field of Classification Search
CPC .............. G06Q 20/3829; G06Q 20/0658
USPC .............................................. 705/71
See application file for complete search history.

(56) References Cited

U.S. PATENT DOCUMENTS

2024/0396754 A1* 11/2024 Wright ............... H04L 9/50

OTHER PUBLICATIONS

Mell "Augmenting Fiat Currency with an Integrated Managed Cryptocurrencyâ", ArXiv article 1912.06487, Fourteenth International Conference on Software Engineering Advances (ICSEA) 2019, 8 pages (Year: 2019).*

* cited by examiner

*Primary Examiner* — James D Nigh
(74) *Attorney, Agent, or Firm* — Lee & Hayes, P.C.

(57) ABSTRACT

Systems and methods for staking instrument cryptocurrency rewards and validator management are disclosed. The systems and methods include generating validator pods associated with cryptocurrency staking validation and generating validator keys configured to be utilized by the validator pods for validating proof of stake operations. A subsets of the validator keys may be assigned to the validator pods and a request to perform the proof of stake operations may be received. A validator pod may be provisioned for validating proof of stake operations, and the validator node may be utilized to validate proof of stake operations based on the selected validator node being a compliant validator node.

20 Claims, 16 Drawing Sheets

Key

Key: String <HashKey>
Type: String/Enum (BLS12-381, ...)
Status: String/Enum (reserved, unreserved, deleted, ...)

KeyCounts keyType: String/Enum <HashKey> (BLS12-381)
Status: String/Enum
Count: Number

Queries

1. Get-Set key by type=... and status='unreserved'
2. Get total key count by (type, status)
   1. Due to Key-Value Database limitations of requiring a scan to calculate a count, store counts in separate table and update from API when new keys are added/removed

Constraints

1. Key attribute must be unique, guaranteed by declaring as hash-key

Secondary indices

1. None

FIG. 8

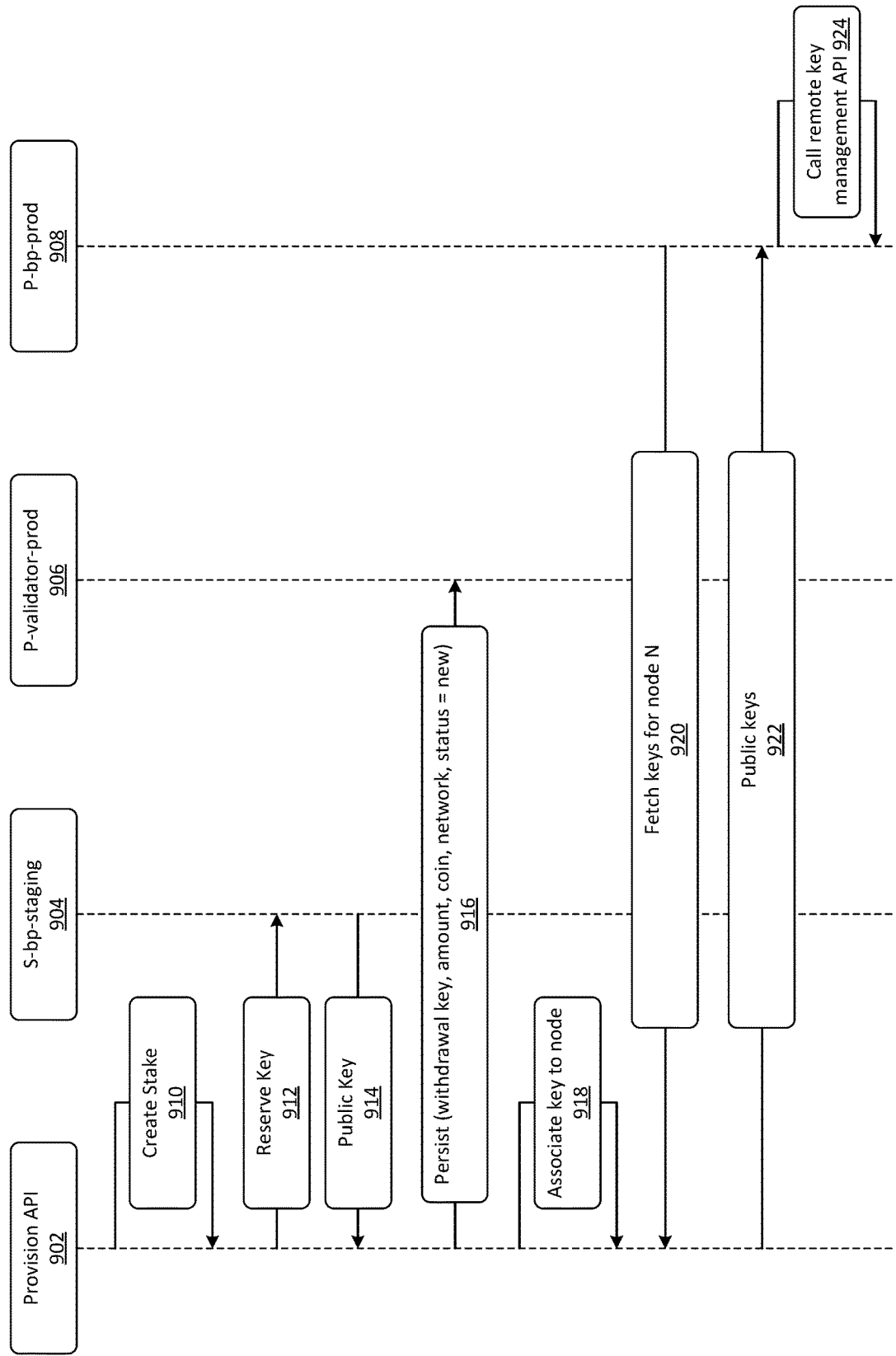

1400 ─┐

```
┌─────────────────────────────────────────────────────────────────────────┐
│ Generate validator pods associated with cryptocurrency staking          │
│ validation, individual ones of validator pods including multiple        │
│ validator nodes configured to validate proof of stake operations        │
│ associated with cryptocurrency transaction                              │
│                              1402                                        │
└─────────────────────────────────────────────────────────────────────────┘
                                    │
                                    ▼
┌─────────────────────────────────────────────────────────────────────────┐
│ Generate validator keys configured to be utilized by validator pods for │
│ validating proof of stake operations                                    │
│                              1404                                        │
└─────────────────────────────────────────────────────────────────────────┘
                                    │
                                    ▼
┌─────────────────────────────────────────────────────────────────────────┐
│ Assign subsets of validator keys to validator pods such that each of    │
│ validator pods includes at least threshold number of validator keys     │
│                              1406                                        │
└─────────────────────────────────────────────────────────────────────────┘
                                    │
                                    ▼
┌─────────────────────────────────────────────────────────────────────────┐
│ Receive request to perform proof of stake operations associated         │
│ cryptocurrency transaction                                              │
│                              1408                                        │
└─────────────────────────────────────────────────────────────────────────┘
                                    │
                                    ▼
┌─────────────────────────────────────────────────────────────────────────┐
│ Provision, based at least in part on receiving request, validator pod   │
│ of validator pods to cryptocurrency transaction for validating proof of │
│ stake operations                                                        │
│                              1410                                        │
└─────────────────────────────────────────────────────────────────────────┘
                                    │
                                    ▼
┌─────────────────────────────────────────────────────────────────────────┐
│ Determine that validator pod includes validator node that is compliant  │
│ validator node                                                          │
│                              1412                                        │
└─────────────────────────────────────────────────────────────────────────┘
                                    │
                                    ▼
┌─────────────────────────────────────────────────────────────────────────┐
│ Utilize validator node to validate proof of stake operations            │
│                              1414                                        │
└─────────────────────────────────────────────────────────────────────────┘
                                    │
                                    ▼
┌─────────────────────────────────────────────────────────────────────────┐
│ Receive cryptocurrency reward based at least in part on utilizing       │
│ validator node to validate proof of stake operations                    │
│                              1416                                        │
└─────────────────────────────────────────────────────────────────────────┘
```

FIG. 14

CRYPTOCURRENCY STAKING VALIDATOR SYSTEM

PRIORITY

This application claims priority to U.S. Provisional Patent Application No. 63/409,945, filed on Sep. 26, 2022, entitled "Cryptocurrency Staking Validator System," the entire contents of which are incorporated herein by reference.

BACKGROUND

Blockchain companies offer the ability to earn staking rewards to earn passive income on crypto assets. Described herein are improvements in technology and solutions to technical problems that can be used to, among other things, assist in proliferating staking of cryptocurrency.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 8 illustrates various data formatted in tables associated with key materials described herein.

FIG. 9 illustrates a sequence diagram of an example process for utilizing a staking API.

FIG. 14 illustrates another example process associated with a cryptocurrency staking validator system.

DETAILED DESCRIPTION

Figure 1:
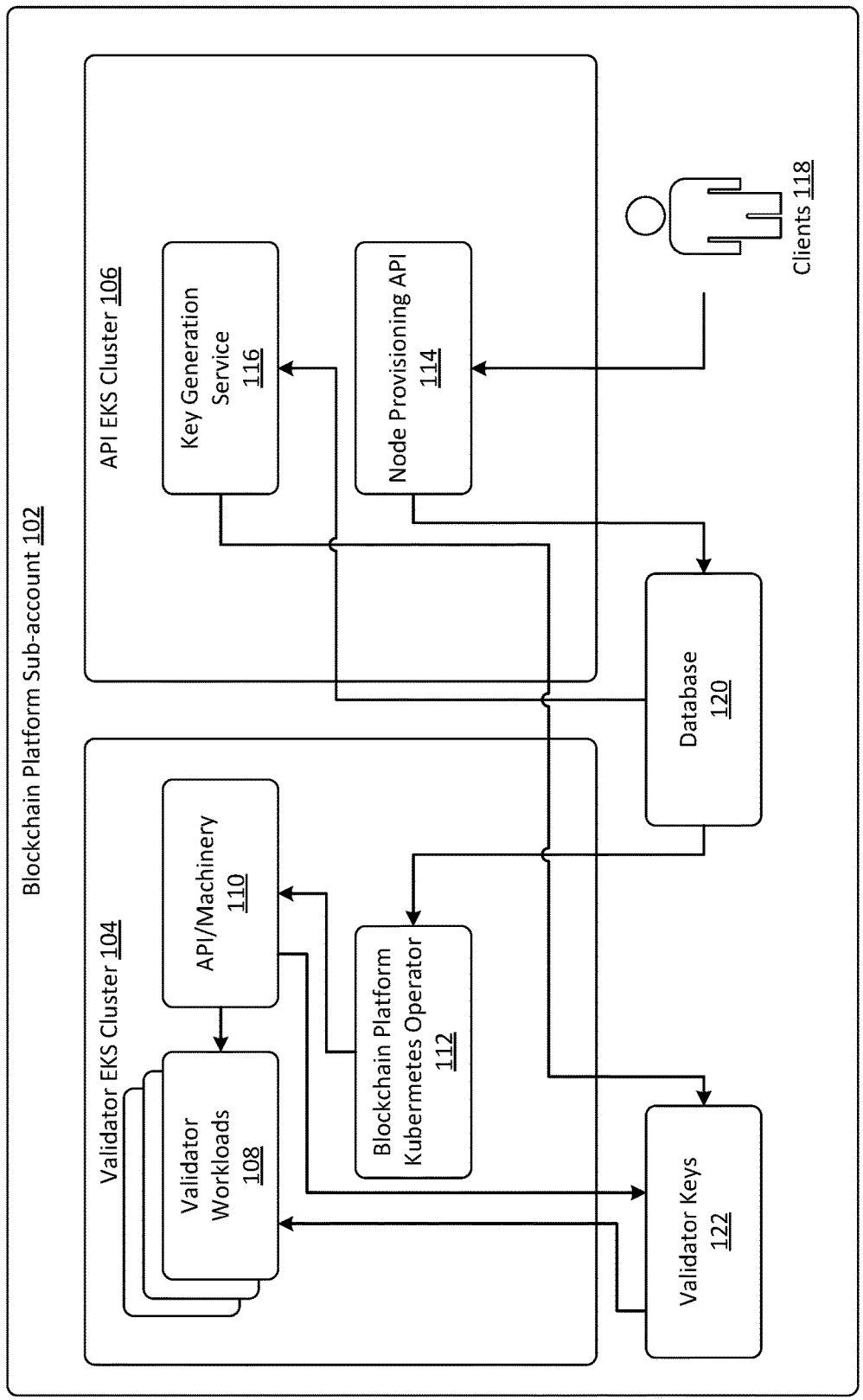
FIG. 1 illustrates an example environment for a cryptocurrency staking validator system.

Systems and methods for staking cryptocurrency to earn staking rewards and/or passive income on cryptocurrency assets are disclosed. Staking, also described as proof-of-stake (PoS) protocols, may be described as a class of consensus mechanisms for blockchains that work by selecting validators in proportion to their quantity of holdings in the associated cryptocurrency. For a blockchain transaction to be recognized, it may be appended to the blockchain. In the PoS blockchain, the appending entities are named minters or validators. In some protocols, the validators receive a reward for doing so. For the blockchain to remain secure, it may have a mechanism to prevent a malicious user or group from taking over a majority of validation. PoS accomplishes this by requiring that validators have some quantity of blockchain tokens, requiring potential attackers to acquire a large fraction of the tokens on the blockchain to mount an attack.

To execute on staking quickly, middlemen may be utilized. With this in mind, there is a margin that such middlemen and/or any similar infrastructure service may be collecting, either through a cut of rewards, or infrastructure bills. To remove the middleman, a validator infrastructure as a service may be implemented as described herein.

Existing coin infrastructures may require validators and revamping to achieve operational excellence. Existing infrastructures may facilitate communicating signed messages to a blockchain network (RPC nodes) and may not be dependent upon a large number of services running. Additionally, third party pieces of software are not often provided access to any keys that have access to customer funds. As such, there may be a number of challenges to overcome in order to deliver infrastructure services to support creating validator nodes as a service for a staking platform.

In examples, the staking platform may need to efficiently run and operate thousands of Ethereum (i.e., eth) validator keys. It should be understood that while Ethereum is utilized as an example cryptocurrency, any cryptocurrency existing now and/or in the future may be utilized instead of or in addition to Ethereum. In other examples, the staking platform may need to include industry standard key management. For example, this may include secure key storage and remote signing infrastructure. In examples, the staking platform may need relatively quick creation time of a large number (e.g., thousands) of validator keys within, for example, 24 hours. Further, in examples, the staking platform may need high availability (e.g., 99.95% uptime). For example, an expected offline penalty should be near equal to the amount that would have been earned if online during that period. Such penalties may include, for example, 00.05% penalty of 1 eth per year. Further, this example assumes a reward that is around 1 eth per year for 32 eth, which may fluctuate. In examples, the penalty may be further derived from the lowest dependent Service Level Agreement (i.e., SLA) Elastic Container Service (i.e., ECS), by way of example.

In examples, the staking platform may include ECS clusters deployed which have the ability to house and secure keys. Further, in example, the staking platform may have a defined Helm chart which effectively deploys an initial Ethereum validator service prysm any number of times. Further, any dependent validator resources may be created and managed automatically. Additionally, any pod (which may be described as a methodology for cross-chain staking) can be efficiently rescheduled and started within minutes on a different server. A different server can be in any different availability zone in a single region of operation.

In examples, each validator may have associated monitoring instruments so that a blockchain platform team may be notified whenever a node is at risk of going out of SLA, or in violation of SLA. These metrics will include balance information on each of the validators. In examples, an application programming interface (API) may facilitate declaring the validator nodes that should be running. Further, this information may then be persisted to database tables. Inside of each ECS cluster a service may then run and query these tables to determine how to reconcile resources to match what is in the database.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

With respect to FIG. 1, the staking platform may be divided into four tracks. Track 1 may include a cloud computing service and infrastructure. Track 2 may include key management. Track 3 may include validator as a service architecture. Track 4 may include validator service machinery (API driven infrastructure).

Referring to Track 1, a set of cloud computing accounts 102 (which may also be described as blockchain platform sub-accounts 102) may be generated that can host a set of container orchestration system clusters (e.g., a validator EKS cluster 104 and/or an API EKS cluster 106) to provide the container orchestration for the validator as a service to host Ethereum 2.0, beacon and validator nodes, with an availability of at least 99.95% which is derived from ECS availability.

In examples, a collection of cloud computing accounts may be created to host development and production workloads hosting the validator as a service accounts. In examples, this may enable iteration over deployments in a more dynamic fashion, as well as increasing a velocity of changes in current nodes. Further, hosting the Ethereum nodes in the container orchestration system may not have to maintain, patch, monitor and operate nomad and its derivatives for deployments. Currently, blockchain daemons may be deployed into various servers where there may be deployment of containers within it and monitoring. While this may serve its purpose it may require manual operation to create a new server, bootstrapping it and making it available for the daemons.

In examples, operation may be in service specific accounts for security concerns, so the validators may run in an isolated environment accessing their own keys and not sharing mnemonics or signing keys without the need to implement cloud computing resource policies.

In examples, a process for Track 1 may include creating cloud computing accounts, deploying aerospike with batteries included into both cloud computing accounts, defining how many validator nodes a beacon node can handle (ratio), defining correct sizing for GETH nodes, defining correct sizing for beacon nodes, validating communication flows between GETH, beacon, and validator nodes, validating communication flows between beacon and other (external) beacon nodes, and monitoring performance of each node type.

In examples, GETH nodes may include 2 or more cores, 4 of more gigabytes (GB) of RAM, 320 GB free space to sync main net, and/or an SSD with at least 500 GB. In examples, beacon nodes may include 4 or more cores, 16 or more GB of RAM, and 2 or more terabytes (TB) of SSD. In examples, validator nodes may have the same or similar specifications as the beacon nodes.

In examples, using this process may provide continuous integration and continuous delivery (CI/CD) connectivity with services for monitoring and logging. In further examples, within the architecture, different endpoints may be connected and may not traverse the internet. Further, the staking platform can define virtual private cloud (VPC) endpoints so the VPC can talk to the cloud computing services and resources directly. Additionally, in examples, connectivity to the internet may be made via an internet gateway which may be connected to a private network via a transit gateway using a hub-and-spoke model, managed by a network team.

In examples, accounts may be isolated via VPC and resources. In further examples, connectivity to development accounts may be made from development accounts, staging accounts to staging accounts and production accounts exclusively to production accounts. For example, this connectivity may be done via the transit gateway at the network layer. Resources with the ECS cluster may also be able to access the resources which may be specific to them using identity and access management (IAM) permissions passed to the container via OpenID Connect (OIDC) (role assumption) to the pod running within the instance defined in the service specification.

In examples, implementation of Track 1 may include a compute and monitoring infrastructure. Further, this may entail use of modules to create cloud computing accounts via IaaS, implement ECS via the aerospike definition which may include monitoring, logging and CI/CD capabilities. In examples, the cluster(s) may be in a sub account depending on workload.

With continued reference to FIG. 1, the validator EKS cluster 104 may include one or more validator workloads 108, API/Machinery 110, and a blockchain platform Kubernetes operator 112. The API EKS cluster 106 may include a node provisioning API 114 and a key generation service 116. In examples, a cryptocurrency-related request may be provided by a client 118. The blockchain platform sub-account may receive the cryptocurrency-related request and a staking process may be initiated. Utilizing the staking platform described herein, the cryptocurrency-related request may be received at the API EKS cluster 106. The node provisioning API 114 may determine which and how many staking nodes are to be utilized to stake the request at issue. The node provisioning API 115 may provide the results of its staking node analysis to a database 120. The database 120 may send (and/or one or more of the components described herein may request) information associated with the selected staking nodes. Such information may be sent, for example, to the key generation service 116. The key generation service may generate one or more validator keys utilizing the information received from the database 120. The data representing the validator keys 122 may be stored.

The database 120 may also send the information in question to the blockchain platform Kubernetes operator 112 (also described as the operator 112) of the validator EKS cluster 104. The blockchain platform Kubernetes operator 112 may be configured to manage containerized applications may be utilized for staking processes described herein. The operator 112 may determine that the cryptocurrency request can be processed utilizing the cloud-based resources available to the blockchain platform sub-account 102 and may send a validator request to the API/Machinery 110. The API/Machinery 110 may then be responsible for calling validator nodes to perform staking validation. To do so, the API/Machinery 110 may call one or more validator workloads 108 to perform validation, and the API/Machinery 110 may send data associated with the validation request(s) to the validator keys 122. The validator keys 112 may then send relevant key material to the validator workloads 108 to allow the validators to perform staking validation.

It should be noted that the exchange of data and/or information as described herein may be performed only in situations where a user has provided consent for the exchange of such information. For example, a user may be provided with the opportunity to opt in and/or opt out of data exchanges between devices and/or with the systems and/or for performance of the functionalities described herein. Additionally, when one of the devices is associated with a first user account and another of the devices is associated with a second user account, user consent may be obtained before performing some, any, or all of the operations and/or processes described herein.

As used herein any of the components and/or systems may utilize processors and non-transitory computer-readable media. A processor may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory may include volatile and nonvolatile memory, removable and non-removable media implemented in any method or technology for storage of information, such as computer-readable instructions, data structures, program component, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) may enable messages between the components and/or devices shown in the systems and/or with one or more other remote systems, as well as other networked devices. Such network interface(s) may include one or more network interface controllers (NICs) or other types of transceiver devices to send and receive messages over the network.

For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

Figure 2:
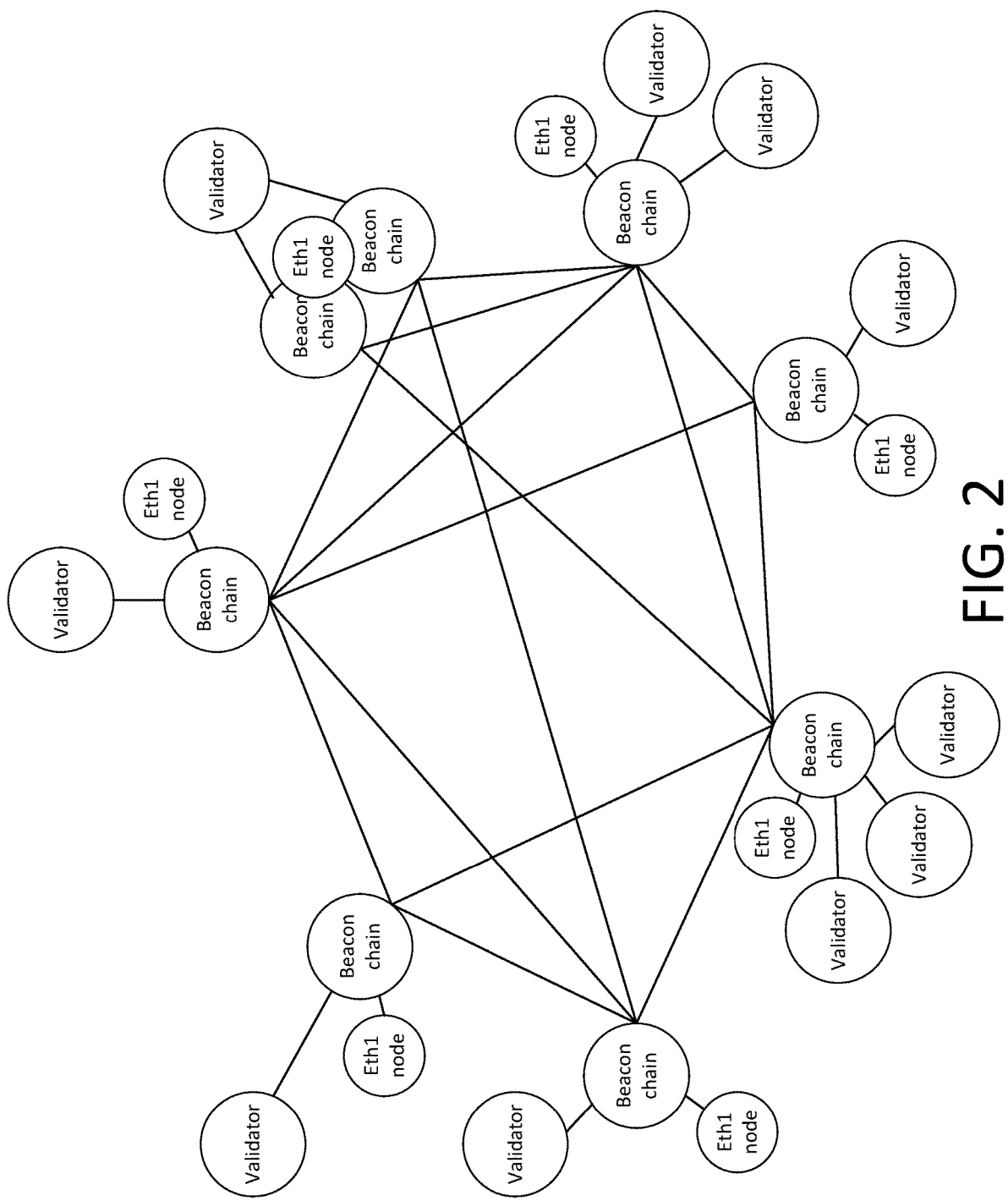
FIG. 2 illustrates a component diagram of example beacon chains, validator nodes, and Eth1 nodes.

With reference to FIG. 2, the process for Track 1 may include creating cloud computing accounts, deploying aerospike with batteries included into both cloud computing accounts, defining how many validator nodes a beacon node (also described with respect to FIG. 2 as beacon chains) can handle (ratio), defining correct sizing for GETH nodes (also described with respect to FIG. 2 as Eth1 nodes), defining correct sizing for beacon nodes, validating communication flows between GETH, beacon, and validator nodes, validating communication flows between beacon and other (external) beacon nodes, and monitoring performance of each node type.

In examples, GETH nodes may include 2 or more cores, 4 of more gigabytes (GB) of RAM, 320 GB free space to sync main net, and/or an SSD with at least 500 GB. In examples, beacon nodes may include 4 or more cores, 16 or more GB of RAM, and 2 or more terabytes (TB) of SSD. In examples, validator nodes may have the same or similar specifications as the beacon nodes.

As shown in FIG. 2, each beacon chain can communicate with other beacon chains, and each beacon chain may be associated with one or more validators. Each beacon chain may also be associated with an Eth1 node. In some examples, some beacon chains may be associated with more than one validator, and/or a given validator may be associated with several beacon chains.

Figure 3:
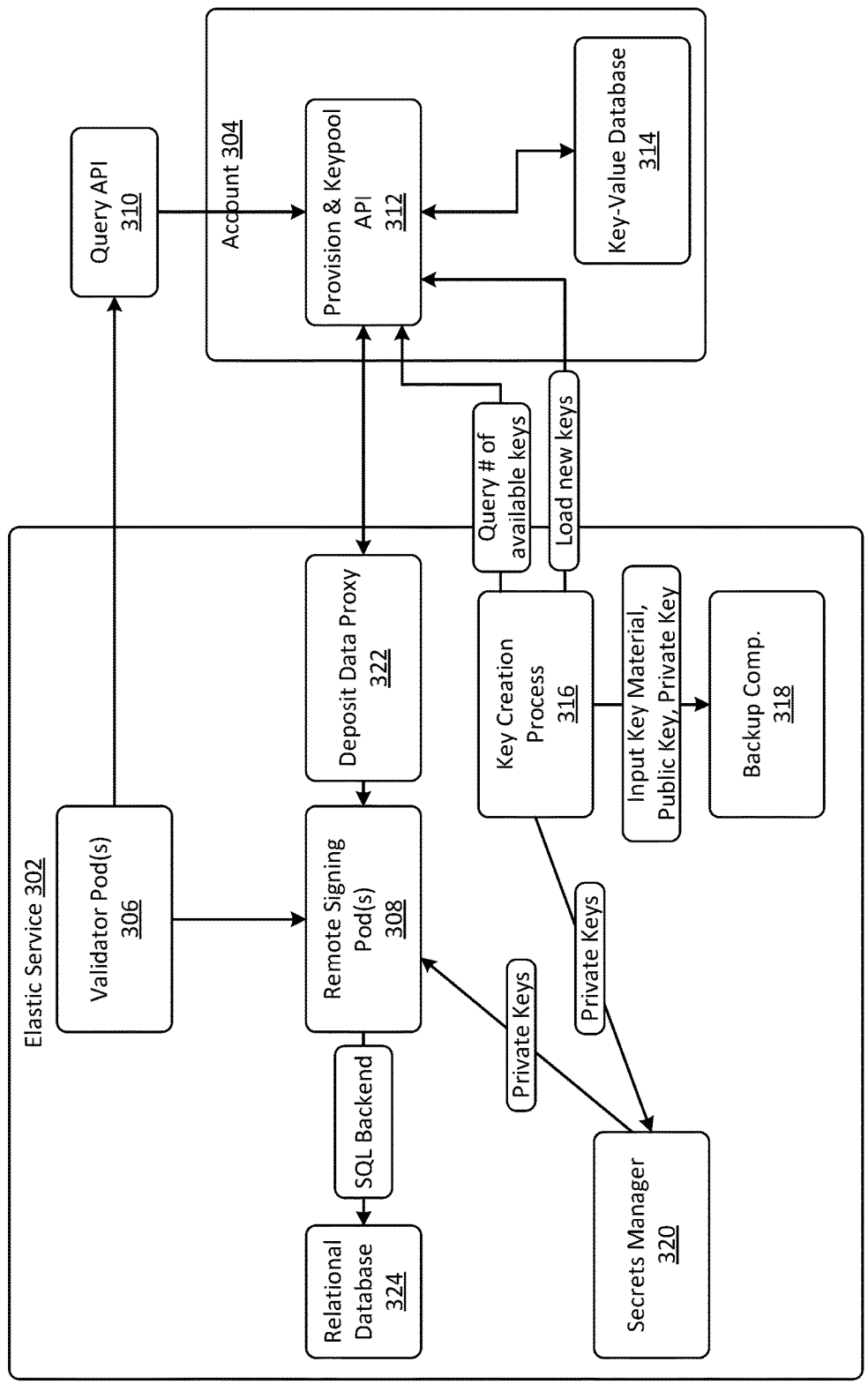
FIG. 3 illustrates a component diagram of example components utilized by a cryptocurrency staking validator system.

With respect to FIG. 3, illustrated is example components and data utilized to communicate between an elastic service 302 and an account 304. Referring to Track 2 from above, Eth2 staking may require creation and management of private validator keys and the usage of these keys in validator processes to sign blocks. As such, the present staking platform is focused on delivering a scalable solution to creating and using these validator keys. For example, a sizable effort (e.g., months to a year, depending on the approach) is common to deliver on a near-perfect solution for key management. Track 2 may be a simpler approach that provides mobility.

In examples, a process in Track 2 may include programmatically creating new Eth2 validator keys, securely storing new keys for retrieval by a signing process, configuring validator clients with their appropriate keys, and updating validator clients and remote signing infrastructure with new keys.

Still referring to Track 2, and regarding keys, Eth2 changes from Eth1 in key usage. Eth2's proof of stake may use two keys, a withdrawal key and validator keys. These keys can be derived from the same mnemonic, and in Eth2 uses the Boneh-Lynn-Shacham (BLS) signature scheme as opposed to Elliptic Curve Digital Signature Algorithm (ECDSA, EoA). When staking Eth2, a staker can provide either an EoA or BLS address for use during withdrawals. The withdrawal process may use the BLS withdrawal key in this process even if a staker provides a different withdrawal key. The validator key cannot be used to move funds.

Regarding wallets, a hierarchical deterministic wallet (HD wallet) can derive multiple validator keys from a single master key/mnemonic, where each validator key can be used by one stake. A nondeterministic wallet (non-HD) uses the first derived key from a mnemonic, and so each key has a separate mnemonic. To avoid a single leak of a mnemonic affecting multiple keys, we will be using non-HD wallets and keys in this design. There is also no need to track indices when generating new keys by not using HD wallets.

In examples, offline penalties may be received whenever a validator does not attest for a given slot/epoch. There may also be a penalty for being late, where each slot a validator is late, its rewards are halved. Slashing is when a validator acts maliciously on the network. Being slashed begins an exit process for a node, and a node may be penalized half an eth or more. In examples, the remaining Ethereum after slashing cannot be accessed and cannot be used to stake again. The remaining Ethereum could be part of another deposit transaction and used as part of a new stake. A common reason validators get slashed is when a single validator key is used by multiple validators, resulting in duplicate attestations, which results in slashing and loss of income. Validators support the use of a remote signer, where the private keys used for validating blocks are not stored on the validator itself, but a separate system. One such remote signer is web3signer. Web3signer also supports slashing protection which can help protect from using the same validator key on multiple validators, so long as both validators are talking to the same web3signer instance.

Regarding key signing, in examples, there may be an ability to securely store new keys (e.g., tens of thousands of keys) for retrieval by the validator process. In other examples, there may be a mechanism to configure validator clients with their appropriate keys. In still further examples, there may be a mechanism to update validator clients and remote signing infrastructure automatically with new keys.

In examples, the staking platform may store signing keys in cloud computing secrets manager and use a cloud computing secrets and configuration provider (SCP) for the container orchestration system secrets store CSI driver and load keys into validator pods at startup. In other examples, the staking platform may store signing keys in cloud computing secrets manager and use a signer configured with cloud computing secrets manager as an external vault to retrieve these and serve them to validator nodes on request. As such, keys may not be on the file system and may not be directly accessed by the validator. Further, this method grants the ability to generate signed messages without implementing signing in-house. Further, keys may be easily shared across multiple containers, unlike keystore files. In examples, the staking platform may use an internal service such as crypto server to manage keys, and have the validator nodes retrieve keys from them using an API similar to signer.

In using signer there may be a need to reload the service manually. For instance, a rolling restart of the service periodically (once every couple hours) may be needed to pick up new keys. Further, if a large amount of keys are made at the same time there may be a risk of not having keys available. In other examples, a system may be implemented to restart automatically when new keys are added. In other examples, when creating IKM (input key material, mnemonics), the IKM may need to be stored separately from the private keys. Signer assumes only the private key is stored in the secret store backend selected. As such, when offloading key management to crypto server, this complication be abated.

In examples, there may be a need and/or ability to securely store new keys for retrieval by the signing process. For example, signer supports secrets manager, cloud computing vault, and keystore files for this. In examples, there may also be a need and/or ability to store two versions of the signing keys. For instances, one of which may be solely the private key in plaintext, for signer to retrieve. The other may be a JSON formatted blob which includes the mnemonic, salt, and private key all together. As such, this may be for backup purposes in the event there is a need to generate additional keys from the same IKM.

In examples, key creation may include an ability to programmatically create new Eth2 (BLS) validator keys. For example, these keys may be created on demand. As such, the staking platform may create keys as requests for validators come in. This may require an automated process able to create an arbitrary number of keys, store them securely, and associate them with either active or new validator/signer resources at time of API call. As such, this approach may require validators able to have keys added after starting. As such, this approach may be unable to do real time with API requests, necessitating a 2nd call to retrieve deposit data.

As shown in FIG. 3, the elastic service may include one or more validator pods 306. The validator pods 306 may send key signing requests to remote signing pod(s) 308 and to a query API 310. The query API may communicate the signing request to a provision and keypool API 312 of the account 304. Having received the request, the provision and keypool API 312 may request and receive key-value information from a key-value database 314 associated with the account 304.

Additionally, as described above, a key creation process 316 may be performed by the elastic service 302. Key materials may be generated as part of the key creation process 316 and may be sent to a backup component 318 for storage in case one or more of the key management processes described herein are not performed correctly. Additionally, the key creation process 316 may include querying the number of available keys associated with a given account 304 and/or may load new keys to the provision and keypool API 312. The private keys created as part of the key creation process 316 may be sent to the secrets manager 320.

When the staking request is received at the remote signing pod(s), deposit data from a deposit data proxy 322 may be received and private key information may be received from the secrets manager 320. Remote signing may then be performed as part of the staking process and data associated therewith may be sent via a SQL backend to a relational database 324.

Figure 4:
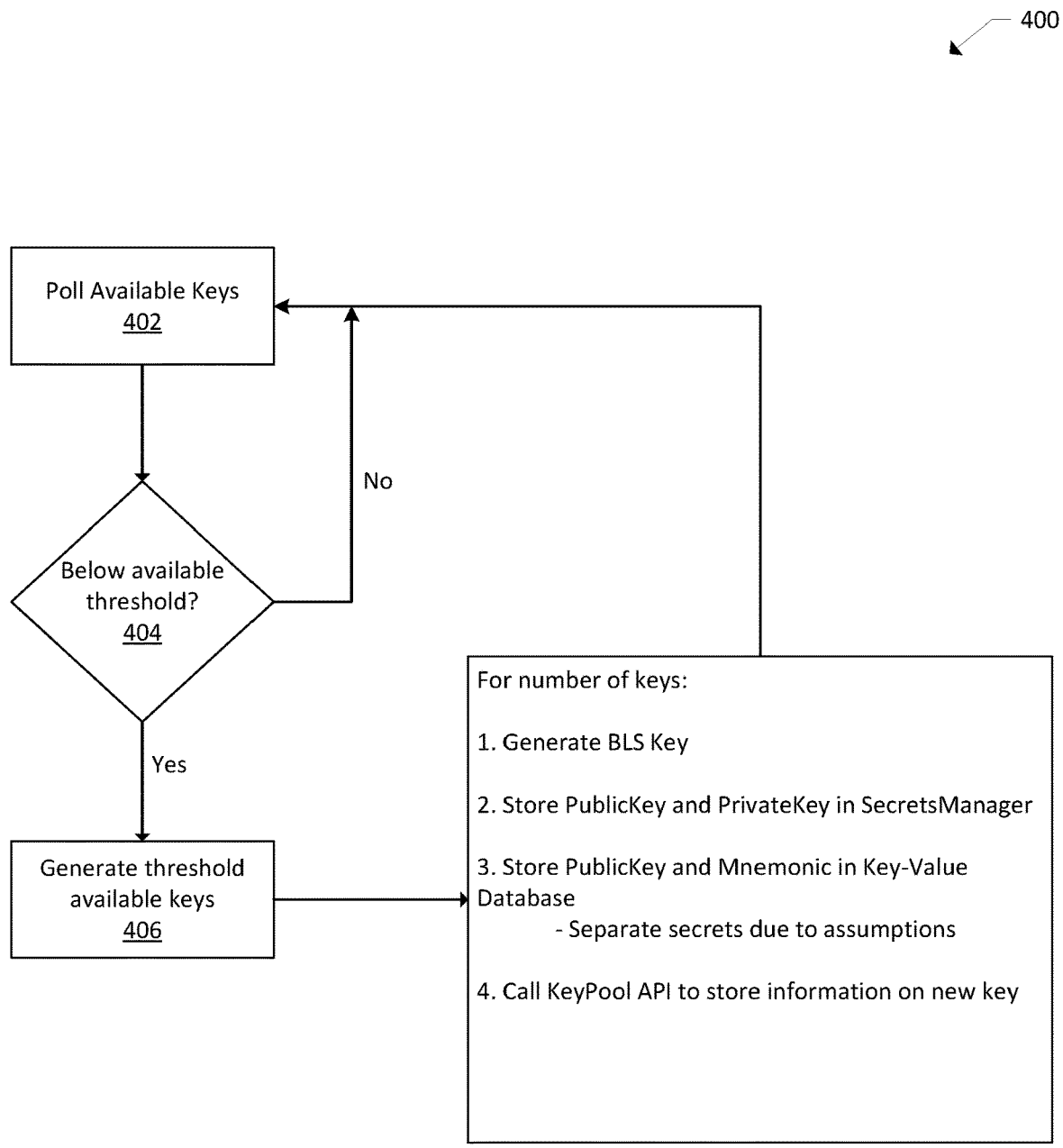
FIG. 4 illustrates an example process and associated data for polling key materials for a cryptocurrency staking validator system.

FIG. 4 illustrates processes for polling for key counts. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3 and 5-16, although the processes may be implemented in a wide variety of other environments, architectures and systems.

With respect to FIG. 4, key creation may be performed by batch. For example, the staking platform may create a certain number of keys at a time and pre-assign to validators. This may allow the API to return results immediately based on pre-allocated resources. This generation process can be prompted automatically as a monitoring process detects a predetermined number of keys remaining unassigned. Further, validators may start with all the keys they will ever be assigned. Validator keys not yet assigned to a stake may regularly watch for a stake assignment transaction and start staking when it sees one. In other examples, the staking platform may create a large number of validator keys (e.g., 10,000) ahead of time, knowing this number should be more than sufficient for the projected usage in the near term. In examples, the staking platform may create keys ahead of time in order to provide a real-time experience to our end-user flows.

As shown in FIG. 4, at block 402, the process 400 may include polling available keys associated with a given account or set of accounts. The polling may include querying the account(s) for an indication of the number of keys associated with the account(s) and a maximum number of keys that may be associated with the account(s). The order in which the operations or steps are described is not intended to be construed as a limitation, and any number of the described operations may be combined in any order and/or in parallel to implement process 400.

At block 404, the process 400 may include determining whether the available keys is below the available threshold.

In examples where the number of keys is below the available threshold, the process 400 may include, at block 406, generating the threshold number of available keys. In examples where the number of keys is not below the available threshold, the process 400 may revert back to block 402 where the number of available keys may continue to be polled.

For each key that is generated, the key material generation process may include generating a BLS key, storing the public key and private key in the secrets manager described above, storing the public key and mnemonic in the key-value database described herein, calling the keypool API to store information on the new key. When the public key and the mnemonic is stored in the key-value database, secrets associated with the key material may be stored separately due to certain assumptions associated with the key generation and storage process.

Figure 5:
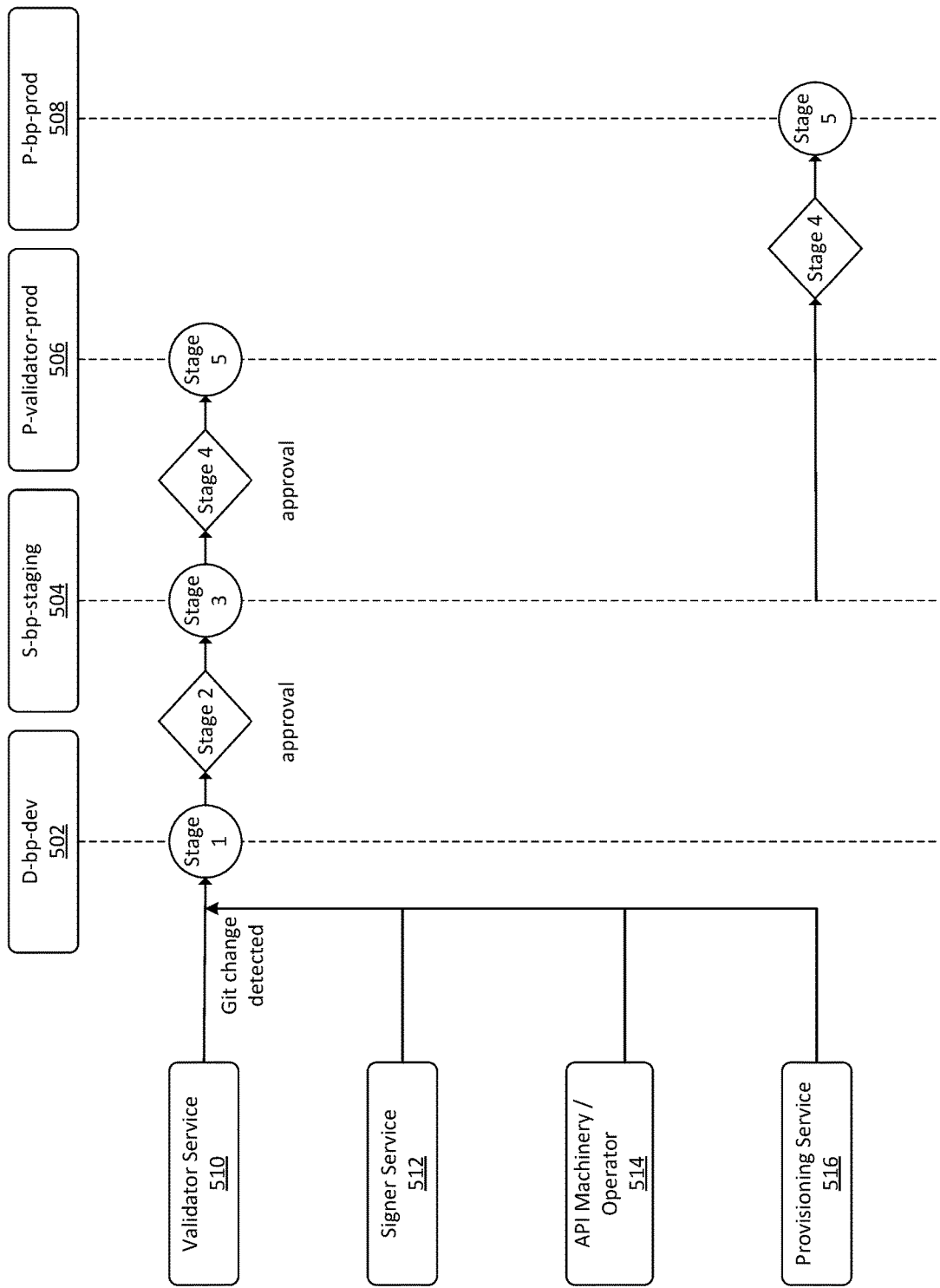
FIG. 5 illustrates a sequence diagram of example stages involved in the development, staging, and production environments associated with various data pipelines.

With respect to FIG. 5, in examples, the staking platform may further include helper infrastructure. For example, the product may include a validator sidecar. As such, inside of validator pods a sidecar may run which queries the provision API to fetch the keys that should be running on the validator in question, and call APIs on the local validator process so that it matches intent.

In examples, the staking platform may include deposit data signing. For instance, to support creating signed deposit data on the fly there is an API which provides the ability to create this data. This API forwards requests to signer and it is exposed to the provision API. The service is disposed within the same ECS cluster as signer in order to have local access to sensitive signer APIs. This piece may be broken out specifically, which may limit exposure to just signing deposit data which is much lower risk than other Web3Signer APIs (e.g., attestation, aggregation_slot, voluntary_exit, etc). Further, the risk with exposing this API is that whoever has this deposit data may be able to create a new deposit with one of the validator keys using their own Ether. If someone were to break in and perform this action, a validator may be running for them. As such, a decision may be made to stop running with that particular validator key and they would stop earning rewards.

Referring now to Track 3, the staking platform may include a dynamic and expressive service/infrastructure framework and lifecycle management solution capable of being utilized by Blockchain Platform's Validator-as-a-Service for managing the provisioning and operational complexities of running Ethereum block validators and participating in the network's decentralized Proof-of-Stake consensus on behalf of potential customers. For example, this may entail leveraging a container orchestration system-based infrastructure platform, Aerospike, consisting of a toolset and the vast library of both native as well as custom container orchestration system resources and integrations, which may provide these services in a secure, fault-tolerant and flexible manner.

In examples, the staking platform may include an infrastructure-as-code (IaC) solution for automating the provisioning of consensus validator client and associated infrastructure services' compute resources and service configs/artifacts. In examples, the staking platform may define data management lifecycle policies for data persistence profiles across service and service-dependency deployments. In further examples, the staking platform may incorporate a service networking mesh solution for providing traffic management e.g. inter-service routing, failure recovery and load balancing, observability and an end-to-end view of traffic flow and service performance, and/or a secure communication protocol enforcing encryption, role-based access, and authentication across services. In other examples, the product may integrate with a key secrets management system as well as provide native platform options for various use cases involving secrets. In still further examples, the staking platform may establish a validation framework for testing/verifying expected client and network functionality and state across environments and the end-to-end software development lifecycle. Additionally, in examples, the staking platform may provide a means for API Machinery and infrastructure tooling to programmatically manipulate infrastructure state.

In examples, the staking platform may be designed to have labels and use container orchestration system labels to specify identifying attributes of objects that may be meaningful and relevant to operators and infrastructure organizational structure (i.e. organizing and filtering sets of objects according to various profiles based on role, environment, release type, tier and a myriad of other forms of classification) but do not directly imply semantics to the core system. As such, the following set of labels may provide a basis for each object definition with more to be added as use cases warrant. For examples, a role (e.g. prysm-validator, web3-signer), an environment (e.g. dev, integration-test, performance-test, staging, production, disaster-recovery), and a release (e.g. stable/latest, <version>, canary).

In examples, serving in a sense as an index of auxiliary or supplementary service information, container orchestration system annotations may be used to attach arbitrary non-identifying metadata to objects as a means for code libraries or clients to retrieve this metadata in order to drive programmatic business logic. This may include but is not limited to pointers to logging, monitoring and network traffic analytics, user or tool/system provenance/source information, such as validator ID and key allocation details and related objects from other ecosystem components, and/or role status or rollout information: for example, validator activation dates or checkpoints.

In examples, the product may include namespaces. As such, namespaces may provide a mechanism for isolating groups of resources within a single cluster. For example, leveraging this resource isolation may partition established per-environment clusters into separate "virtual" clusters for various use-cases and scenario testing. For example, individual and dedicated/isolated VaaS systems can be spun up on the integration-test cluster, namespaced perhaps by developer id or a PR being tested, and operated on throughout the lifecycle of the integration testing; subsequently destroyed efficiently following completion.

In other examples, the staking platform may be running as a part of the VaaS system, container orchestration system provides two long-running execution and/or workload objects relevant for purposes which may include deployments (e.g., a resource for declaring update and replication strategies for a process unit or pod) and/or Statefulsets (e.g., a resource for declaring update, replication in addition to state persistence strategies for a process unit or pod that also provides guarantees about the ordering and uniqueness of each replicated object). As such, based on a design making use of a remote signer tool and the stateless nature of prysm validators when slashing protection duties are delegated to a remote signer, deployment objects may be used for validator workloads which may provide sufficient capabilities for any deployment needs and avoid unnecessarily incurring the overhead of operating Statefulsets, associated headless services and an assumed Statefulness despite potential operational efficiency gains which may be obtained from leveraging certain features like native ordinal naming schemes and pod identification stickiness.

In further examples, client configurations and run-time parameters may act as an operational interface between an application and its users or operators. With regard to the Ethereum network, this interface generally supports control of various client behaviors like: a specific blockchain network to join, whether and how to expose a particular API webserver or feature or where to store chain data. As such, there may be 3 clients or roles/actors necessary for the operation of Ethereum's Proof-of-Stake consensus mechanism including an execution client (e.g. geth, nimbus, besu), a consensus beacon-node client (e.g. prysm, lighthouse, teku, lodestar), and/or a consensus validator client (same as beacon-node).

In examples, certain bootstrap/initialization steps may be utilized in order to setup environment state for proper validator functionality/operations. These steps will likely involve: bulk loading remote signer keys, ensuring proper access permissions to service/application state and runtime directories, and/or performing database initialization operations (e.g. creating schemas, dbs etc). As such, container orchestration system initiation containers may provide a native mechanism for accomplishing these bootstrapping steps independent of app/service configuration though tightly coupled with the fate of the deployment process. To demonstrate, the following initiation-container definition could be used by each web3signer deployment for loading remote signer keys from secrets manager, a secured keystore.

In examples, following initial deployment, container orchestration system' startup, liveness and readiness probes may be utilized as a means to evaluate service health/functionality and fitness for properly performing expected operations.

In examples, providing extended service readiness detection on initialization, startup probes may be useful for providing an additional layer of detection for potentially long running and prone to failure service bootstrapping or initialization operations (e.g. remote signer key loading, database migrations).

In further examples, there may be times when services may be temporarily unable to serve traffic due to a variety of reasons not necessarily indicating application failure or malfunction. This can include node bootstrapping or sync states, temporary loss of communication between dependent services like databases and other transient errors caused by software or environmental factors. In such cases, container orchestration system may provide readiness probes to detect and mitigate these situations.

In examples, container orchestration system may provide liveness probes to detect and remedy situations in which over time long running applications eventually transition to unrecoverable broken states, except by restart/process reset. Liveness probes can serve as the first signal of detecting when any applications have transitioned into the aforementioned unhealthy state. Further, the probes may generally consist of basic uptime signals (e.g. whether services are alive and listening on expected ports).

In other examples, container allocations or pods (with respect to container orchestration system) may support a resources property, which includes compute/memory capacity requests and upper limits. The container orchestration system documentation can provide more details though conceptually limits act as hard upper-bounds (generally resulting in resource throttling or deactivation) and requests serve as hints or weighting strategies for resolving resource contention. As such, container orchestration system' resources constraint mechanism may be leveraged to fine tune service resource footprints and optimize service utilization efficiency and placement.

In examples, while container orchestration system supports per-application/service programmatic autoscaling, the product may allow API machinery and operator tooling to manage the scale at which components are deployed. This scale management is likely to be measured in the number of service deployments (e.g. with standalone/isolated validator clients) or number of service replicas a part of a single deployment where access to the service can be distributed (e.g. the API machinery deployment).

In further examples, container orchestration system natively supports constraining placement of particular applications to a specific set of nodes including a nodeSelector field matching against node labels, Affinity and anti-affinity, and a nodeName field. As such, such constraints may be unnecessary, as the scheduler will automatically attempt to conduct a reasonable placement policy; however, there are some circumstances in which the staking platform may control which node a pod or deployment group deploys to. For example, such circumstances potentially include, though are not limited to: ensuring web3signer services (and likely validators) are placed on nodes with dedicated and high-performance networking capabilities, assigning postgres instances (if necessary) to disk optimized instance types for handling I/O load and performance optimization, and assigning expendable, stateless services (e.g. API machinery) to low-cost and high node capacity cluster groups for redundancy.

In examples, storage or state persistence for container orchestration system applications can generally be thought as consisting of two cloud-provider agnostic, orthogonal though more often than not tightly interconnected concepts: 1. the physical storage layer at which application data is remotely persisted, and 2. the orchestration layer which regulates application "claims" to this underlying storage provider. The former, more commonly referred to as StorageClasses with respect to container orchestration system primitives, represents an abstraction over the type or "classes" of storage offered by a particular administrator to describe different characteristics of the options provided. These characteristics generally relate to storage I/O performance, quality-of-service levels, backup policies, or perhaps arbitrary policies customized for specific cluster profiles.

In other examples, PersistentVolumeClaims may be manifested as a specification and status of claims to these storage classes and typically encapsulates storage size, application binding and input/output access properties. Persistent volume claims can be used throughout the VaaS system infrastructure for matching use-cases (e.g. database state management) and their storage requirements with the StorageClasses made available for certain projects by Platform.

In further examples, based on ADR 0005—container orchestration system container Networking Interface Decision, a VPC CNI plugin for container orchestration system may be leveraged. While ECS supports native VPC networking with the VPC Container Network Interface (CNI) plugin for container orchestration system, the container orchestration system plugin provides certain advantages such as allowing container orchestration system pods to have the same IP address inside pods as they do on the VPC network. As such, this may achieve native networking performance between pods and surrounding VPC components. This may layer virtualization found throughout application architectures based on container orchestration system and can significantly degrade transactional performance, especially when it comes to high scale network message passing operations, establish performance benchmarks at or near native speeds observed without the added virtualization layers is critical for the network uptime and responsiveness of validator services, policies can be managed allowing for programmatic and dynamic update processes based on human operator or software defined triggers, and/or integrate with VPC Flow Logs which enables auditing of access patterns across validator and infrastructure services for threat (-model) and optimization analysis.

In examples, ExternalDNS may synchronize exposed container orchestration system services and ingresses and may make container orchestration system resources discoverable via public DNS servers. As such, leveraging this mechanism, in tandem with the Istio Service Mesh/Ingress service, the staking platform may expose external traffic to services within the VaaS system where appropriate. For instance, this may include but is not limited to: API/Provisioning service exposure for partner service integration and/or external access for deployed beacon-node/execution client peer communication.

In further examples, external secrets may be a container orchestration system operator that integrates external secret management systems like secrets manager, cloud computing vault, etc. As such, the operator may read information from external APIs and automatically injects the values into a container orchestration system secret.

In further examples, secrets manager may exist within private infrastructure as a secrets store backend for various types of sensitive data. As such, this managed service may be used for storing sensitive validator and API machinery data such as: validating private/public key pairs, validator mnemonics associated with key data and to be used as an associated key generation seed, HTTPS/TLS certificates for secure communication between ecosystem components, and/or cloud computing dependency service access credentials (may be superseded and rendered unnecessary by Service Account and RBAC policies).

In examples, a container orchestration system service account may provide an identity for processes that run in a pod. As such, service accounts may be assigned to all role instances tied to role-based access policies, based on role type, curated according to the "principle of least privilege" and the necessary resource dependencies of each role/actor.

In examples, container orchestration system role-based access control (RBAC) may be used as a method of regulating access to computer or network resources based on the roles of individual users within an organization. RBAC authorization may use the rbac.authorization.k8s.io API group to drive authorization decisions, allowing dynamic configuration of policies through the container orchestration system API.

In other examples, a data service may provide a variety of native container orchestration system log collection mechanisms. As such, the staking platform may leverage a method dependent on deployment resource annotations and/or service metrics served on. Further, while the data service may serve as the primary observability service used by VaaS system services, it may be worth noting that a significant number of both cloud native and blockchain application clients natively support and expose metrics over a collection system endpoint. As such, the Ethereum execution and consensus clients, Geth and Prysm respectively, may be no exception.

Additionally, the staking platform may use integration based on container orchestration system annotations. For example, each deployment can expose the following set of namespaced annotations that will direct DaemonSets running on all container orchestration system cluster nodes on how to access and scrape its formatted metrics endpoint. Further, there may be considerable SDK support and experience leveraging client libraries across common languages (e.g. Scala, Golang, Python) used throughout the staking platform; however it may be left as an exercise for API Machinery to determine how to emit metrics from related internal infrastructure services.

In examples, verification of functionality and expected behaviors of components within the VaaS system can be accomplished by a multitude of methods. The following may include solutions that can be leveraged by the platform to execute test suites across the spectrum of test types (e.g. unit, functional, integration, performance). For example, a testkube may be implemented which may be a cloud-native and container orchestration system-native project for testing k8s applications. As such, this may make it easy to orchestrate and run any kinds of tests—functional, load/performance, security, compliance, etc., in clusters, without having to wrap them in docker-images or provide network access. Additionally, it may make it possible to decouple test execution from build processes, allowing engineers to run specific tests whenever needed. Further, it may centralize all test results in a consistent format for actionable QA analytics. Additionally, it may provide a modular architecture for adding new types of test scripts and executors. In examples, the staking platform may include a container orchestration system-native load testing tool. As such, the staking platform may determine checks and thresholds—for goal-oriented, automation-friendly load testing. In further examples, the staking platform may include an octopus which is a testing framework that allows running tests defined as docker images on a running cluster. As such, this may replace the helm test by providing these additional features.

In other examples, environments may function similar to traditional infrastructure deployment site definition-usually representing stages or phases set throughout the software development lifecycle (e.g. development, staging, production). As such, an environment solution typical of other projects and matching the examples previously mentioned but also designed in such a way that development and QA/staging environments are shared across services while production environments are reserved for various service types (where appropriate), placed according to shared resource and security considerations may be utilized.

In further examples, harness pipelines may define a release process using multiple workflows and approvals in sequential and/or parallel stages. Pipelines can involve multiple services, environments, and workflows. A pipeline can be triggered either manually or using triggers. As such, separate and dedicated pipelines per deployable unit or service may be leveraged as a basis with the potential to develop subsequent pipelines for managing various operational/administration tasks.

Additionally, harness workflows may define the deployment orchestration steps, including how a service is deployed, verified, rolled back, and more. Some of the workflow types may be Canary, Blue/Green, and Rolling. An application might have different deployment orchestration steps for different environments, each managed in a workflow. As such, developing workflows on a per-service; per-environment basis may consist of the following base set of steps with more to come as use-case warrants including deploying, following a git change trigger, to service development environment, performing gate by unit/functional tests, deploying service to staging environment, performing gate by integration tests, waiting for approval via native approval techniques or integrations, and deploying service to production environment.

In examples, pipelines can be triggered using harness triggers. There may be various types of triggers related to cron and git events etc. The platform may have setup a git flow trigger for projects based on the harness-git-sync repo, which reacts to push/pull requests to applications. As such, a git-sync trigger setup (demonstrated below) may be leveraged.

As shown in FIG. 5, various pipelines such as the validator service 510, the signer service 512, the API Machinery/Operator 514, and/or the provisioning service 516 may interact with a number of environments, such as d-bp-dev 502, s-bp-staging 504, p-validator-prod 506, and/or p-bp-prod 508.

At stage 1, the development environment of d-bp-dev 502 may be involved in development deployment. The development process may then be approved or otherwise validated at stage 2. At stage 3, staging may be performed in the staging environment on s-bp-staging 504. Once deployed, at stage 4, the deployment may be validated or otherwise approved across one or more production environments, such as p-validator-prod 506 and/or p-bp-prod 508. At stage 5, the production deployment may occur with the various pipelines being utilized for development and staging prior to production.

In further examples, API Machinery service may include one interface into manipulating VaaS system and service resources. As such, both container orchestration system and Helm SDKs available may be leveraged as libraries for whichever languages we decide to write our services in.

Referring now to Track 4, running validators (to participate in proof of stake consensus) at scale may utilize a large amount of services to create, run, and maintain. To remove this operational work an API and machinery may be created to define and manage blockchain platform resources.

In examples, an interface may be configured to interact with and manage resources is the node provisioning API. As such, this API may be a CRUD REST application which defines resources inside of database tables. Based on database state, resources may be either provisioned or removed to match a storage backend. There may be two services to fulfill this. For example, first may be the Key Generation Service (KGS). Asynchronously the KGS may create keys and insert them into a data backend, on secrets manager. With keys available and validator definitions made, a container orchestration system operator may interface with the container orchestration system API to create the appropriate resources inside of the local container orchestration system cluster that it's running inside of.

Figure 6:
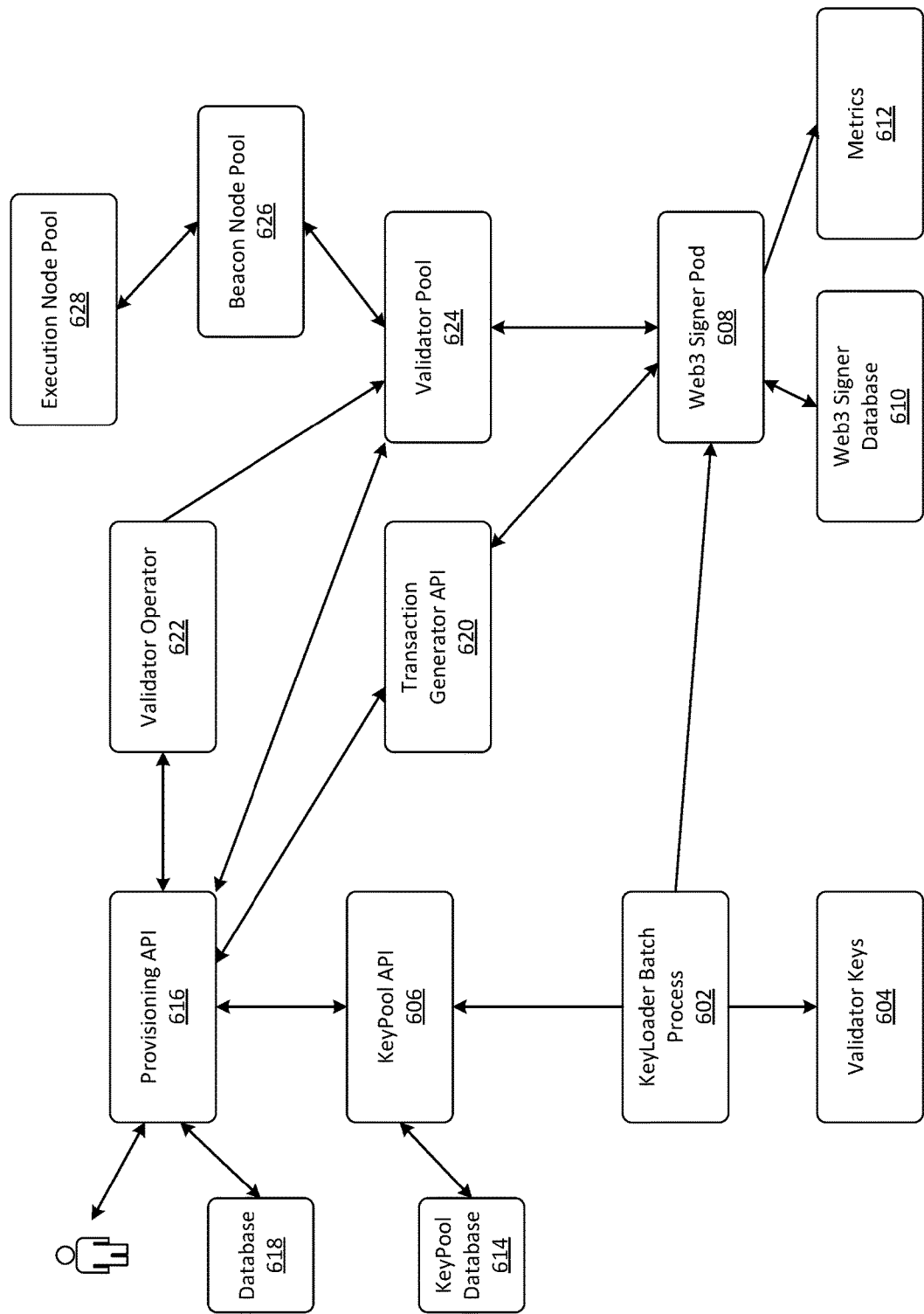
FIG. 6 illustrates a conceptual diagram of example components utilized by a cryptocurrency staking validator system.

With respect to FIG. 6, a keyloader batch process 602 may initiate key loading during a runtime scenario by providing validator keys 604 and by communicating with a keypool API 606 and a Web3 signer pod 608. The Web3 signer pod 608 may be responsible for signing processes and as such may communicate with a Web3signer database 610 for signer-based information and with a metrics database 612 for one or more metrics as described herein for performing signing processes. The keypool API 606 may be utilized to communicate with a keypool database 614 for keypool information as described herein. The keypool API 606 may communicate with the provisioning API 616 for provisioning resources for staking services performed during runtime. The provisioning API 616 may communicate with the database 618 and/or one or more clients (e.g., users) for details associated with a staking transaction. The provisioning API 616 may also receive information from the Web3 signer pod 608, which may be sent via the transaction generator API 620. With the appropriate signer services employed and the relevant data determined for the staking at issue, the provisioning API 616 may communicate with the validator operator 622 for validation services. The validator operator 622 may query the validator pool 624 for validation nodes that may be utilized to validate a given staking-based request. The validator pool 624 may in turn communicate with the beacon node pool 626 and the execution node pool 628 for determining which nodes will be involved in proof of staking performed by the staking platform.

Figure 7:
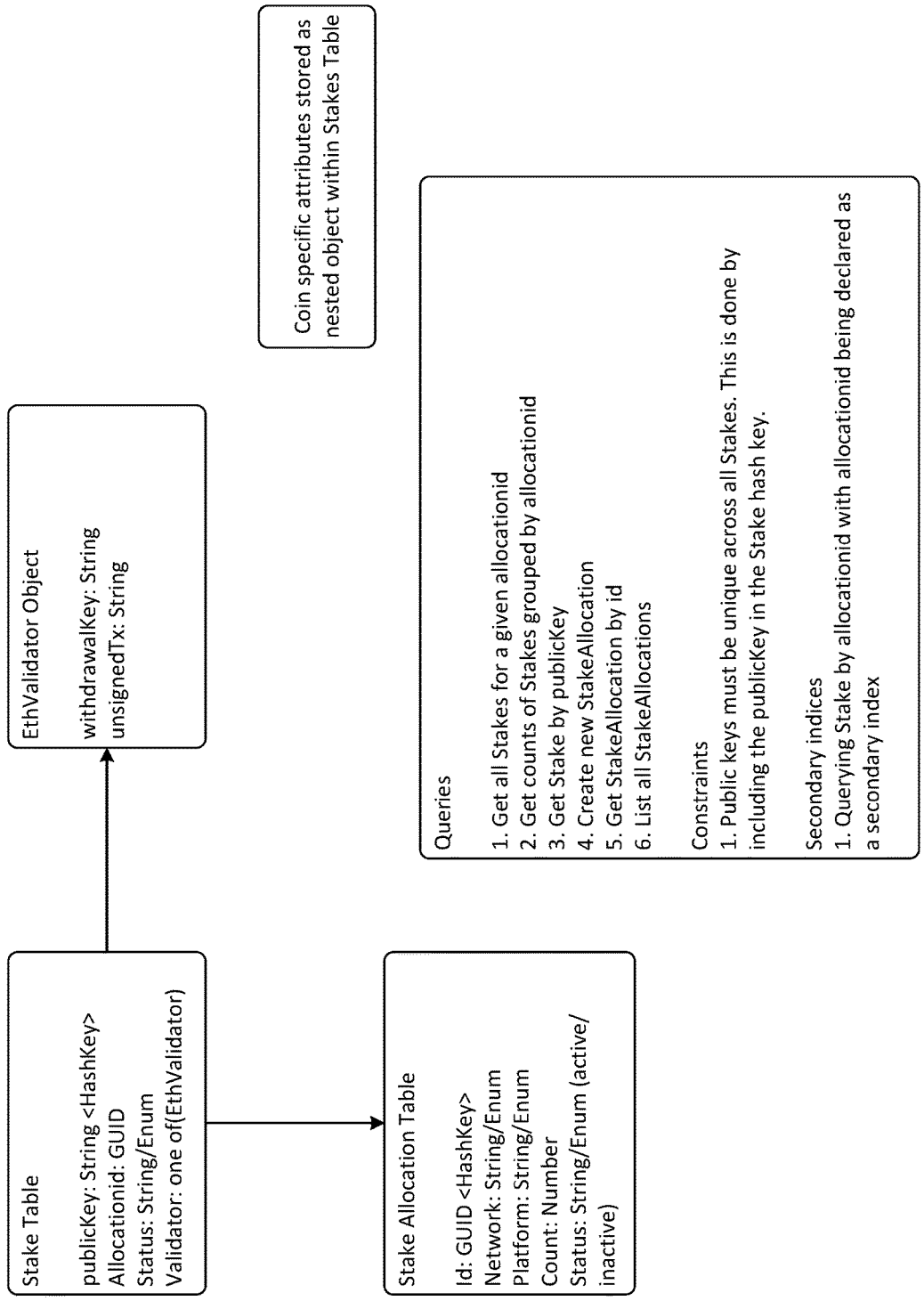
FIG. 7 illustrates various data formatted in tables utilized by the cryptocurrency staking validator system.

As shown in FIG. 7, in examples, data may be stored in a database, a fully managed and serverless database for high-performance applications. For example, a given stake table may include information such as the public key at issue, the allocation identifier at issue, a status of the staking, and a validator that has been selected. A given stake allocation table may include information such as an identifier of the stake allocation, a network at issue, a platform at issue, a count of the stake allocation, and/or a status of the stake allocation. A given validator object (here an example Ethereum validator object) may include information such as a withdrawal key and unsigned Tx information. In addition to the stake table, the stake allocation table, and the validator object, coin or otherwise cryptocurrency specific attributes may be stored as nested objects within given stake tables. When these tables are queried, as shown in FIG. 7, the queries may be for, for example, one or more of getting all stakes for a given allocation identifier, getting counts of stakes grouped by allocation identifier, getting a stake by public key, creating a new stake and/or allocation, getting a stake allocation by identifier, and/or for a list of stake allocations. Some constraints on such queries may be, for example, public keys being unique across stakes. The queries may also include one or more secondary indices, such as querying stakes by allocation identifier with the allocation identifier being declared as a secondary index.

With respect to FIG. 8, a key management table design may include information associated with keys, key counts, and queries associated with such keys. For example, the key table may include information associated with the key identifier (which may be hashed), a key type, and/or a status of the key. The key counts information may include, for example, key type information, status information, and count information. The queries associated with such keys may include, for example, getting and/or setting keys by type and/or status and/or getting a total key count. In examples, due to key-value database limitations of requiring a scan to calculate a count, counts may be stored in a separate table and may be updated from the relevant API when new keys are added/removed. An example constraint may be that key attributes must be unique, which may guaranteed by declaring hash keys. In this example, there may be no secondary indices.

In examples, a node provisioning API may be made up of two parts, the staking API which may be used by external clients and the allocations API which may be used internally by other services. Further, the staking API may be an external facing API. It may be a simple CRUD app used for creating, retrieving and exiting stakes. For generating the unsigned transaction, the staking API may interface with the transaction generator. In further examples, the staking admin API may be an internal API. It may also be a CRUD app for creating staking groups. This API may be used by the container orchestration system operator in reconciling the state of the cluster. When a new staking request comes in, a key may be reserved for it, being marked as "reserved" (allocated) to a validator. The StakingGroups table can then hold a count of how many keys have been allocated for a given validator. Once a validator reaches the max number of keys it can hold, a new staking group may be created via the API. From there, the cycle may continue.

In examples, when a new stake is created, an unsigned transaction may need to be returned to the client. The transaction generator may be responsible for generating this message based on ETH2 requirements. Once created, the message may need to be signed using the withdrawal credentials and the private key. Because of this, this service may also act as a proxy between the StakeAPI and Signer because Signer will have access to the private key information.

In other examples, validators may need to be able to reserve keys. The Key Pool may create API endpoints allowing for the node provisioning API to determine which keys are available to the validators. When a validator is being reserved, it may make a request to the Key Pool for a key. The Key Pool may then provide that key, and mark it as reserved in its database. Additionally, it can provide information about the number of unreserved keys in its database. This may also be used by the Key Loader process in determining when to batch generate keys.

In further examples, a container orchestration system operator can be developed in order to reconcile what is stored in a database with the cluster. The operator can fetch the allocations using the allocations API. When it determines that a new allocation has been created, it may scale up the validator pods. In addition to this, it may also need to ensure the beacon and execution nodes are scaling appropriately in relation to the validator nodes.

In examples, Prysm validator pods may ensure the keys are being synced properly. On pod startup, the sidecar may poll the provision API for the public keys allocated to the node. To ensure the node is fetching the correct validator keys, both the pod and the provision API may include a shared, immutable and persistent identifier. The keys may then be fetched on startup by calling into this API with the validators unique identifier.

FIGS. 9-14 illustrates processes associated with a cryptocurrency staking validator system. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-8, 15, and 16, although the processes may be implemented in a wide variety of other environments, architectures and systems.

With reference to FIG. 9, a process 900 associated with a stake API may be performed. For example, various components and/or environments may be associated with the process 900. By way of example, a provision API 902 may interact with various environments such as a s-bp-staging environment 904, a p-validator-production environment 906, and/or a p-bp-production environment 906.

At block 910, the provision API may create a stake. Creation of a stake may include creation of a request to perform processing associated with staking cryptocurrency, and specifically creating a request to validate staking operations as described herein.

At block 912, the provision API may send a reserve key to the s-bp-staging environment 904. The reserve key may be described in certain examples as a private key or otherwise may be key material that is known to the staking platform for the purpose of validating staking operations.

At block 914, the s-bp-staging environment 904 may send a public key associated with the reserve key to the provision API 902. The public key may be associated with the reserve key and, in connection with the reserve key, may make up the key materials to be utilized for validating staking operations.

At block 916, the provision API 902 may persist the staking request and may send information associated therewith to the p-validator-production environment 906. The information may include, for example, a withdrawal key, an amount of the cryptocurrency at issue, a coin type or otherwise a cryptocurrency type at issue, a network being utilized for the transaction at issue, and/or a status of the staking request. In the example of FIG. 9, the status may be "new" request.

At block 918, the provision API 902 may associate the key materials to a node, such as a validator node as described above. In examples, the provision API 902 may determine which node should be utilized for performing staking validation as well as which key material should be send to such selected node.

At block 920, the p-bp-production environment 908 may fetch or otherwise query the provision API 902 for keys for one or more nodes associated with the p-bp-production environment 908. The provision API 902, at block 922, may send public key materials to the p-bp-production environment 908 in response to the query for the keys associated with the node(s).

At block 924, the p-bp-production environment 908 may call a remote key management API to perform key management operations as described above. Those key management operations may include, by way of example, acquiring additional key materials, acquiring deposit information, determining whether key materials are valid, etc.

Figure 10:
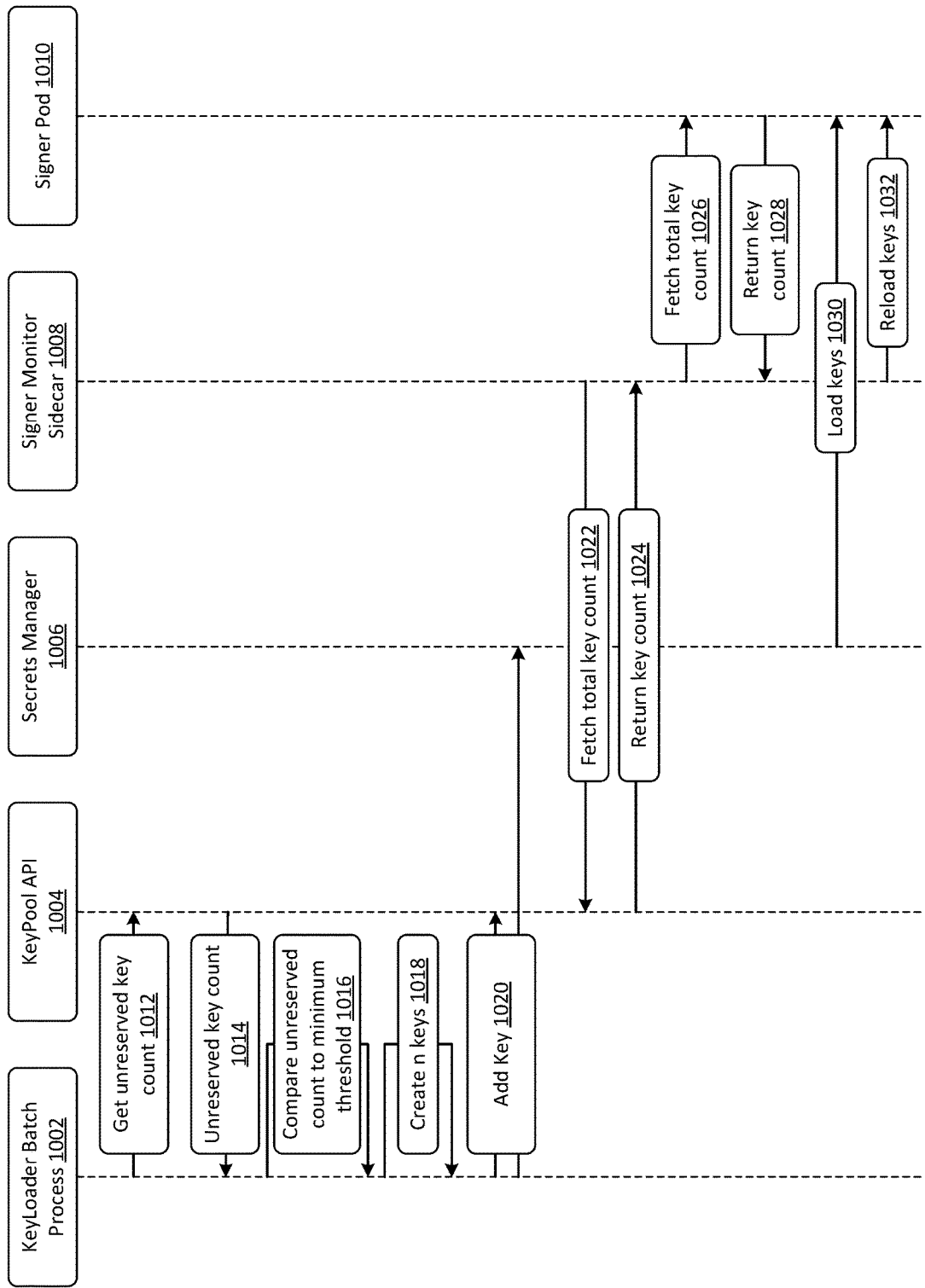
FIG. 10 illustrates a sequence diagram of an example process for managing key materials.

With reference to FIG. 10, a process 1000 for key management, which may be performed after the operations described with respect to FIG. 9, may be performed. Various components may be involved in the process 1000, including, for example, a keyloader batch process 1002, a keypool API 1004, a secrets manager 1006, a signer monitor sidecar 1008, and/or a signer pod 1010.

At block 1012, the keyloader batch process 1002 may get unreserved key count information from the keypool API 1004. In examples, keys may be reserved or unreserved. Reserved keys may be keys that have been created and are already associated with given tasks, such as a validation process. Unreserved keys may be keys that have been created but are not already associated with a given task.

At block 1014, the keypool API 1004 may respond and provide the unreserved key count as requested to the keyloader batch process 1002. The unreserved key count may be zero, one, or more than one. In examples, the count may be simply a value indicating the number of unreserved keys. In other examples, the count may include additional information such as details about the unreserved keys.

At block 1016, the keyloader batch process 1002 may compare the unreserved count to a minimum threshold of unreserved keys. In examples, the keyloader batch process 1002 and/or one or more other components described herein may set the minimum threshold. In some examples, the minimum threshold may be static. In other examples, the minimum threshold may be dynamic and may change as validation requests are received.

At block 1018, the keyloader batch process 1002 may create n number of keys. In this example, the unreserved count may not satisfy the minimum threshold of unreserved keys, and thus the keyloader batch process 1002 may be configured to create a given number of keys. In examples, the number of keys that are created may be a number sufficient to maintain an unreserved count that satisfies the minimum threshold. In other examples, the number of keys to be created may be more than needed to satisfy the minimum threshold.

At block 1020, the keyloader batch process 1002 may add keys to the keypool API 1004 and to the secrets manager 1006. By so doing, the secrets manager may have at least the minimum number of unreserved keys and the keypool API may have information indicating that the minimum number of unreserved keys is available.

At block 1022, the signer monitor sidecar 1008 may fetch or otherwise query the keypool API 1004 for the total key count. In response, the keypool API 1004 may return the total key count at block 1024 to the signer monitor sidecar 1008.

At block 1026, the signer monitor sidecar 1008 may fetch or otherwise query the signer pod 1010 for the total key count associated with the specific signer pod. At block 1028, the signer pod 1010 may return the requested total key count to the signer monitor sidecar 1008.

At block 1030, the secrets manager 1006 may load key materials to the signer pod as needed for the signer pod 1010 to perform signing operations as described herein. Additionally, at block 1032, the signer monitor sidecar 1008 may reload keys as needed to the signer pod 1010 for performing signing operations as described herein.

Figure 11:
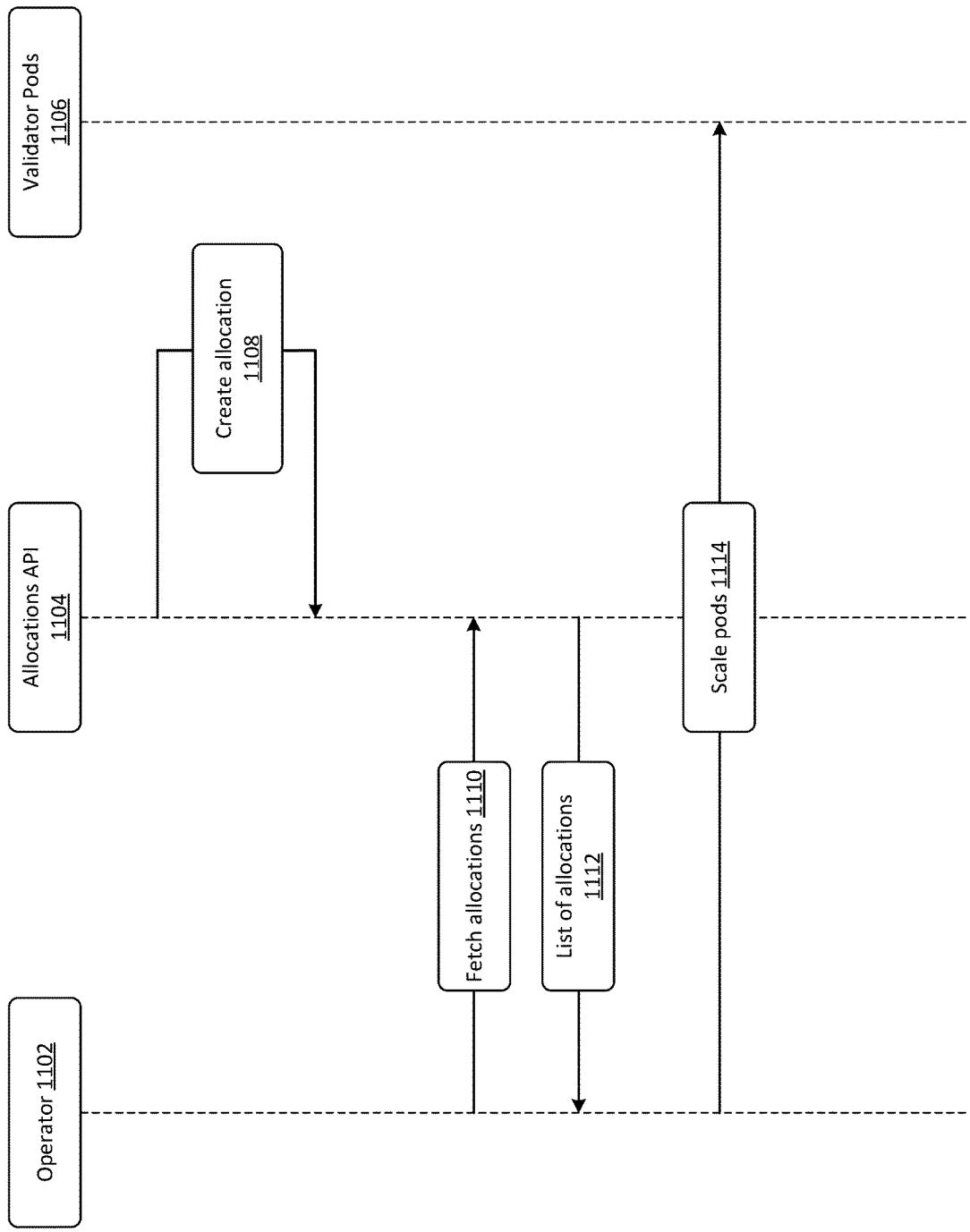
FIG. 11 illustrates a sequence diagram of an example process associated with a Kubernetes operator.

With reference to FIG. 11, a process 1100 associated with a Kubernetes operation may be performed. The process 1100 may include an operator 1102, an allocations API 1104, and/or one or more validator pods 1106.

At block 1108, the allocations API 1104 may create an allocation. As described in more detail above, container allocations or pods (with respect to container orchestration system) may support a resources property, which includes compute/memory capacity requests and upper limits. The container orchestration system documentation can provide more details though conceptually limits act as hard upper-bounds (generally resulting in resource throttling or deactivation) and requests serve as hints or weighting strategies for resolving resource contention. As such, container orchestration system' resources constraint mechanism may be leveraged to fine tune service resource footprints and optimize service utilization efficiency and placement.

At block 1110, the operator 1102 may fetch allocations that have been created from the allocation API 1104. In response, at block 1112, the allocations API 1104 may provide a list of allocations to the operator 1102. The allocations may indicate which validator pods are available for validation operations and/or which key material is available to be utilized to sign staking operations.

At block 1114, the operator 1102 may utilize the allocations as provided by the allocations API 1104 to select and scale one or more of the validator pods 1106. Scaling of the validator pods 1106 may include selecting the validator pods 1106 to perform validation operations and identifying the validator pods 1106 for receipt and/or use of key materials as described herein.

In examples, and because all of the microservices developed may work closely with one another, it may be important they are well tested. Each of the components may include a set of unit tests. For API based services, they can additionally include a set of integration tests.

In examples, and for consistency across the API services, they may be developed in Scala using AkkaHttp. The remaining components may be much smaller in scope. Because of this, it may be up to the developer who is taking up the work to decide on the language. This may ensure that others can get involved in the development. However, the languages may thus be limited to Scala or Go, in certain nonlimiting examples.

Figure 12:
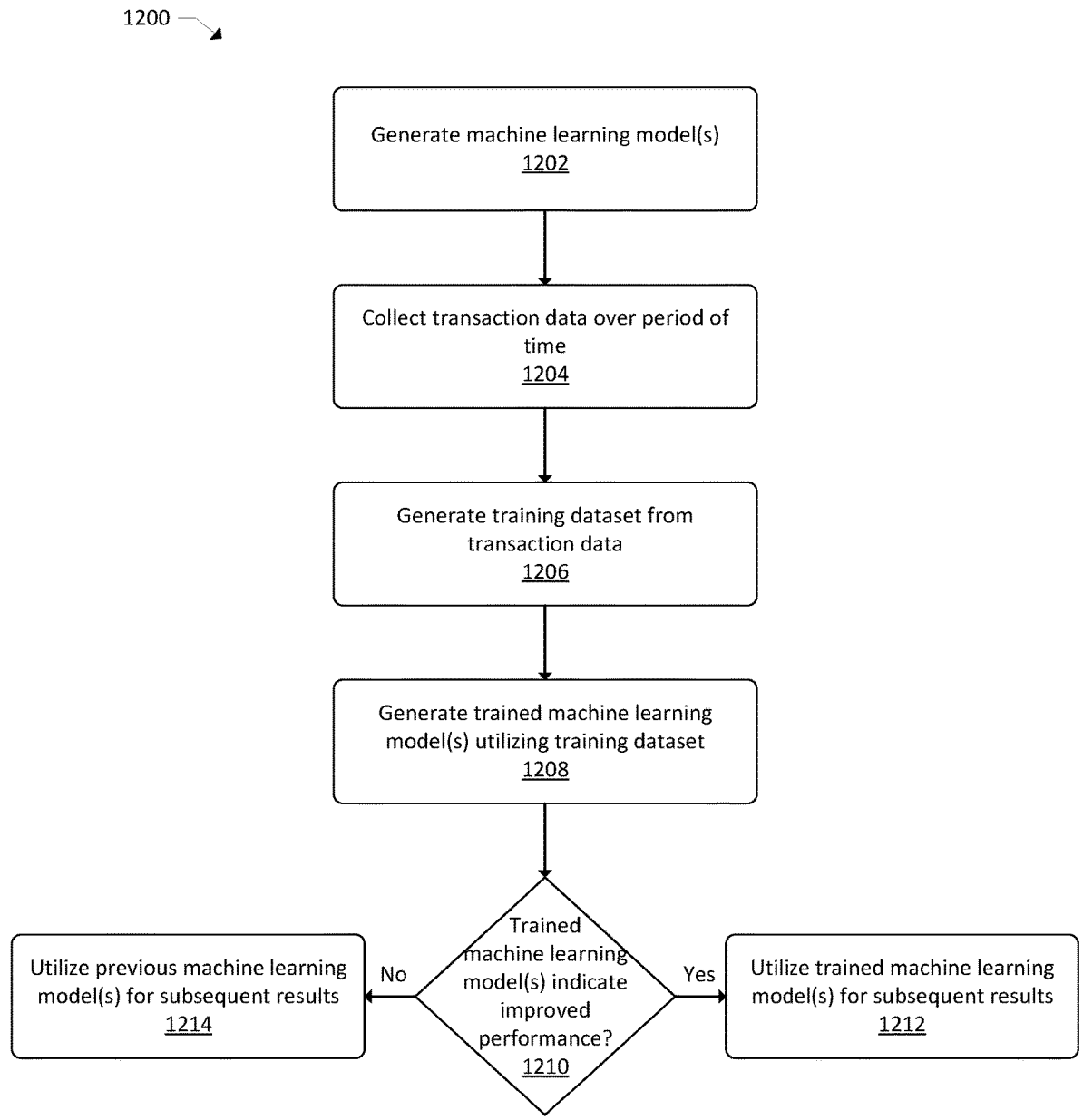
FIG. 12 illustrates a flow diagram of an example process for training and utilizing one or more machine learning models to perform operations as described herein.

FIG. 12 illustrates a flow diagram of an example process 1200 for training and utilizing one or more machine learning models to perform operations as described herein. The order in which the operations or steps are described is not intended to be construed as a limitation, and any number of the described operations may be combined in any order and/or in parallel to implement process 1200.

At block 1202, the process 1200 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 1204, the process 1200 may include collecting transaction data over a period of time. The transaction data may include information associated with cryptocurrency transactions, staking operations, validation operations, key material creation and/or management, etc., and/or any other data described herein.

At block 1206, the process 1200 may include generating a training dataset from the transaction data. Generation of the training dataset may include formatting the transaction data into input vectors for the machine learning model to intake, as well as associating the various data with the transaction outcomes.

At block 1208, the process 1200 may include generating one or more trained machine learning models utilizing the training dataset. Generation of the trained machine learning models may include updating parameters and/or weightings and/or thresholds utilized by the models to generate recommendations and/or to perform adjustments of how the cryptocurrency staking validator system operates, as described herein. It should be understood that the trained machine learning models may be configured to determine factors for recommendations associated with staking validation.

At block 1210, the process 1200 may include determining whether the trained machine learning models indicate improved performance metrics. For example, a testing group may be generated where the outcomes of the recommendations and/or adjustments are known but not to the trained machine learning models. The trained machine learning models may generate the recommendations and/or perform the adjustment operations, which may be compared to the known results to determine whether the results of the trained machine learning model produce a superior result than the results of the machine learning model prior to training.

In examples where the trained machine learning models indicate improved performance metrics, the process 1200 may include, at block 1212, utilizing the trained machine learning models for generating subsequent results.

In examples where the trained machine learning models do not indicate improved performance metrics, the process 1200 may include, at block 1214, utilizing the previous iteration of the machine learning models for generating subsequent results. It should be understood that while several examples of how machine learning models may be utilized are described in FIG. 12, the machine learning models may be utilized to perform any of the processes described herein and/or to make any of the determinations described herein.

Figure 13:
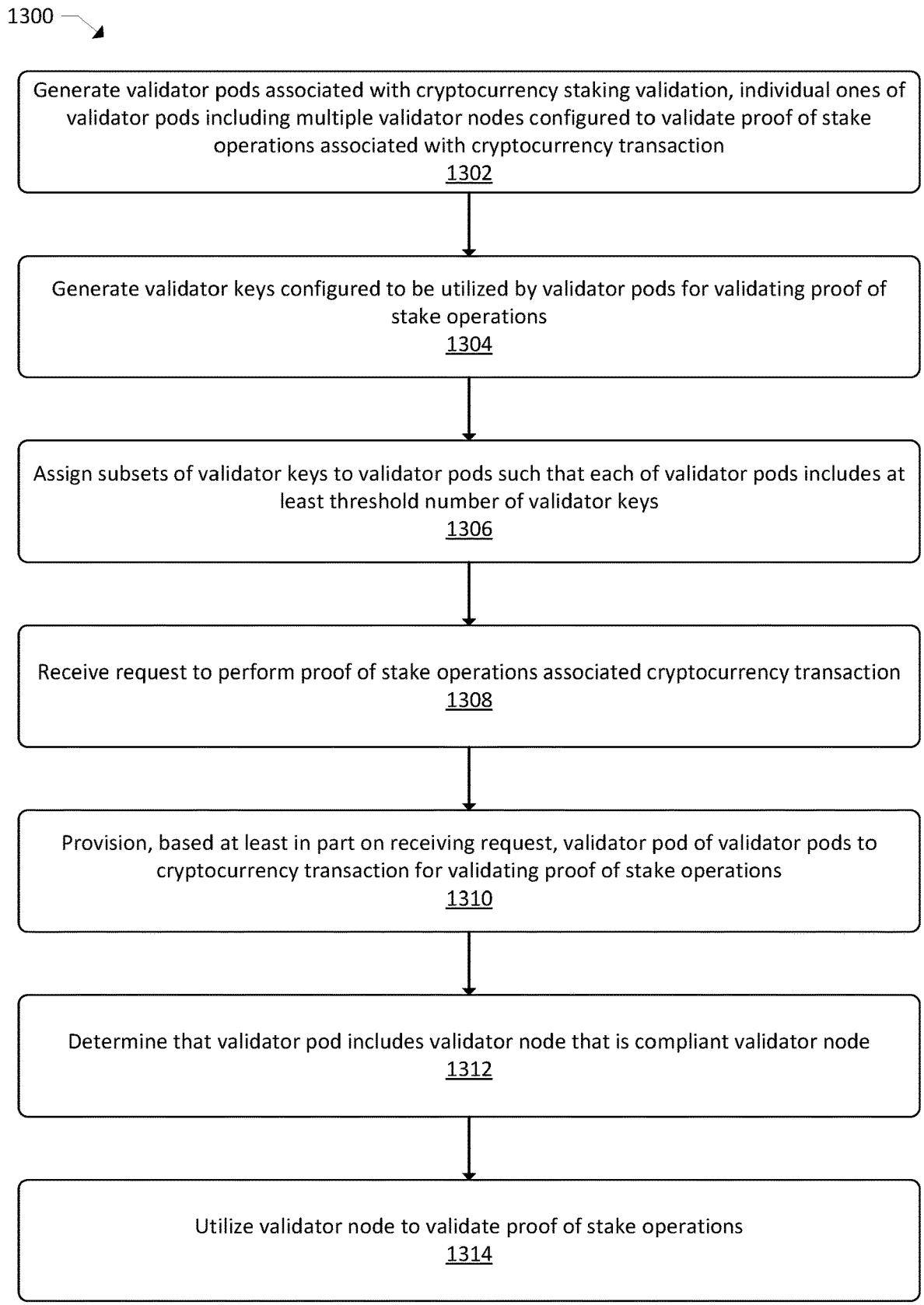
FIG. 13 illustrates an example process associated with a cryptocurrency staking validator system.

FIG. 13 illustrates an example process 1300 associated with a cryptocurrency staking validator system. The order in which the operations or steps are described is not intended to be construed as a limitation, and any number of the described operations may be combined in any order and/or in parallel to implement process 1300.

At block 1302, the process 1300 may include generating validator pods associated with cryptocurrency staking validation, individual ones of the validator pods including multiple validator nodes configured to validate proof of stake operations associated with a cryptocurrency transaction. Additional details on performance of this operation can be found at FIGS. 1-11, above.

At block 1304, the process 1300 may include generating validator keys configured to be utilized by the validator pods for validating the proof of stake operations. Additional details on performance of this operation can be found at FIGS. 1-11, above.

At block 1306, the process 1300 may include assigning subsets of the validator keys to the validator pods such that each of the validator pods includes at least a threshold number of validator keys. Additional details on performance of this operation can be found at FIGS. 1-11, above.

At block 1308, the process 1300 may include receiving a request to perform the proof of stake operations associated the cryptocurrency transaction. Additional details on performance of this operation can be found at FIGS. 1-11, above.

At block 1310, the process 1300 may include provisioning, based at least in part on receiving the request, a validator pod of the validator pods to the cryptocurrency transaction for validating proof of stake operations. Additional details on performance of this operation can be found at FIGS. 1-11, above.

At block 1312, the process 1300 may include determining that the validator pod includes a validator node that is a compliant validator node. Additional details on performance of this operation can be found at FIGS. 1-11, above.

At block 1314, the process 1300 may include utilizing the validator node to validate proof of stake operations. Additional details on performance of this operation can be found at FIGS. 1-11, above.

Additionally, or alternatively, the process 1300 may include provisioning the validator pod utilizing an infrastructure-as-code technique such that the validator pod is automatically provisioned along with compute resources and service configurations to validate the proof of stake operations.

Additionally, or alternatively, the process 1300 may include generating a service networking mesh configured to relate the validator nodes to beacon nodes and to relate the beacon nodes to blockchain-related nodes, wherein the blockchain-related nodes are configured to communicate with the beacon nodes as an entry point into a validator-as-a-service framework operated by the system, and the beacon nodes are configured to communicate with the validator nodes to validate the proof of stake operations. The process 1300 may also include parsing the service networking mesh based at least in part on a network associated with a blockchain of the cryptocurrency transaction, the parsing resulting in selection of a beacon node of the beacon nodes, and wherein the validator node is selected based at least in part on the beacon node that was selected.

Additionally, or alternatively, the process 1300 may include determining a namespace associated with the validator pod. The process 1300 may also include determining groups of computing resources associated with the namespace. The process 1300 may also include provisioning the groups of computing resources in association with the provisioning of the validator pod.

Additionally, or alternatively, the process 1300 may include determining a server running the validator pod. The process 1300 may also include determining that performance metrics of the server satisfy one or more performance thresholds associated with available computing resources and ability to communicate with a network associated with the cryptocurrency transaction. In these examples, determining that the validator pod includes the at least one of the validator nodes that is a compliant validator node may be based at least in part on the performance metrics satisfying the one or more performance thresholds.

Additionally, or alternatively, the process 1300 may include determining to select a different validator node from the validator node based at least in part on at least one of: detection of node bootstrapping; or temporary loss of communication between one or more dependent services and the system.

Additionally, or alternatively, the process 1300 may include the request being received via a staking application programming interface (API) specific to a blockchain associated with the cryptocurrency transaction. The process 1300 may also include provisioning the validator pod utilizing an allocations API that is segregated from the staking API Additionally, or alternatively, the process 1300 may include determining an unreserved encryption key available to the validator node. The process 1300 may also include causing the unreserved encryption key to transition to a reserved encryption key based at least in part on provisioning the validator pod. The process 1300 may also include causing the validator node to utilize the reserved encryption key when validating the proof of stake operations.

FIG. 14 illustrates another example process 1400 associated with a cryptocurrency staking validator system. The order in which the operations or steps are described is not intended to be construed as a limitation, and any number of the described operations may be combined in any order and/or in parallel to implement process 1400.

At block 1402, the process 1400 may include generating validator pods associated with cryptocurrency staking validation, individual ones of the validator pods including multiple validator nodes configured to validate proof of stake operations associated with a cryptocurrency transaction. Additional details on performance of this operation can be found at FIGS. 1-11, above.

At block 1404, the process 1400 may include generating validator keys configured to be utilized by the validator pods for validating the proof of stake operations. Additional details on performance of this operation can be found at FIGS. 1-11, above.

At block 1406, the process 1400 may include assigning subsets of the validator keys to the validator pods such that each of the validator pods includes at least a threshold number of validator keys. Additional details on performance of this operation can be found at FIGS. 1-11, above.

At block 1408, the process 1400 may include receiving a request to perform the proof of stake operations associated the cryptocurrency transaction. Additional details on performance of this operation can be found at FIGS. 1-11, above.

At block 1410, the process 1400 may include provisioning, based at least in part on receiving the request, a validator pod of the validator pods to the cryptocurrency transaction for validating proof of stake operations. Additional details on performance of this operation can be found at FIGS. 1-11, above.

At block 1412, the process 1400 may include determining that the validator pod includes a validator node that is a compliant validator node. Additional details on performance of this operation can be found at FIGS. 1-11, above.

At block 1414, the process 1400 may include utilizing the validator node to validate proof of stake operations. Additional details on performance of this operation can be found at FIGS. 1-11, above.

At block 1416, the process 1400 may include receiving a cryptocurrency reward based at least in part on utilizing the validator node to validate proof of stake operations. Additional details on performance of this operation can be found at FIGS. 1-11, above.

Additionally, or alternatively, the process 1400 may include provisioning the validator pod utilizing an infrastructure-as-code technique such that the validator pod is automatically provisioned along with compute resources and service configurations to validate the proof of stake operations.

Additionally, or alternatively, the process 1400 may include generating a service networking mesh configured to relate the validator nodes to beacon nodes and to relate the beacon nodes to blockchain-related nodes, wherein the blockchain-related nodes are configured to communicate with the beacon nodes as an entry point into a validator-as-a-service framework operated by the system, and the beacon nodes are configured to communicate with the validator nodes to validate the proof of stake operations. The process 1400 may also include parsing the service networking mesh based at least in part on a network associated with a blockchain of the cryptocurrency transaction, the parsing resulting in selection of a beacon node of the beacon nodes, and wherein the validator node is selected based at least in part on the beacon node that was selected.

Additionally, or alternatively, the process 1400 may include determining a namespace associated with the validator pod. The process 1400 may also include determining groups of computing resources associated with the namespace. The process 1400 may also include provisioning the groups of computing resources in association with the provisioning of the validator pod.

Additionally, or alternatively, the process 1400 may include determining a server running the validator pod. The process 1400 may also include determining that performance metrics of the server satisfy one or more performance thresholds associated with available computing resources and ability to communicate with a network associated with the cryptocurrency transaction. In these examples, determining that the validator pod includes the at least one of the validator nodes that is a compliant validator node may be based at least in part on the performance metrics satisfying the one or more performance thresholds.

Additionally, or alternatively, the process 1400 may include determining to select a different validator node from the validator node based at least in part on at least one of: detection of node bootstrapping; or temporary loss of communication between one or more dependent services and the system.

Additionally, or alternatively, the process 1400 may include the request being received via a staking application programming interface (API) specific to a blockchain associated with the cryptocurrency transaction. The process 1400 may also include provisioning the validator pod utilizing an allocations API that is segregated from the staking API.

Additionally, or alternatively, the process 1400 may include determining an unreserved encryption key available to the validator node. The process 1400 may also include causing the unreserved encryption key to transition to a reserved encryption key based at least in part on provisioning the validator pod. The process 1400 may also include causing the validator node to utilize the reserved encryption key when validating the proof of stake operations.

Figure 15:
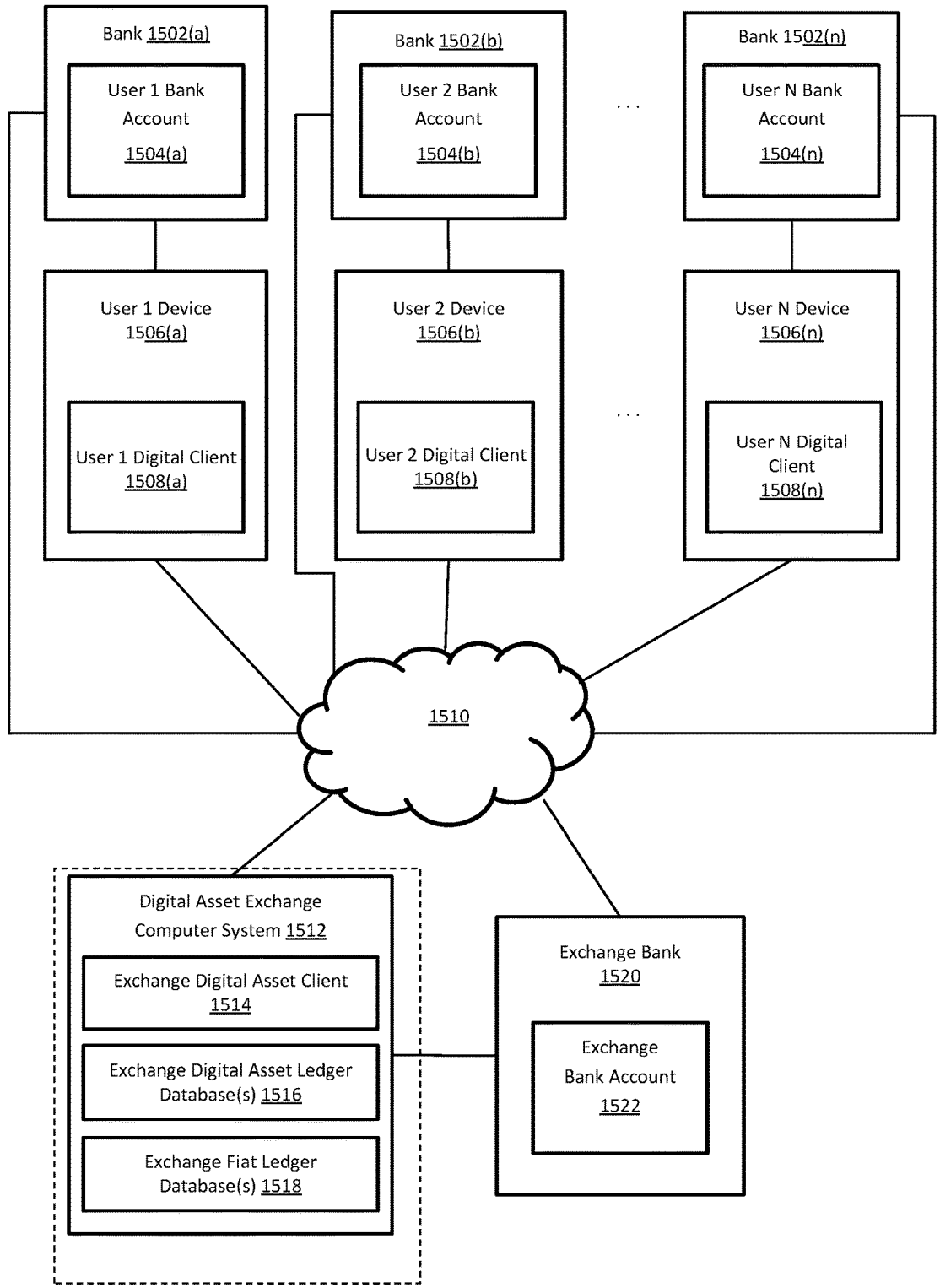
FIG. 15 illustrates a schematic diagram of exemplary participants in a system employing a digital asset exchange.

FIG. 15 illustrates a schematic diagram of exemplary participants in a system employing a digital asset exchange. In a digital asset exchange, one or more customers of the exchange (e.g., User 1, User 2, User 3, etc.) connect via a network 1510 (e.g., the Internet, a local area network, a wide area network, etc.) to a digital asset exchange computer system 1512, using respective one or more user electronic devices 1506 (e.g., 1506(a), 1506(b), . . . , 1506(n)), such as computers, laptops, tablet computers, televisions, mobile phones, smartphones, and/or PDAs, etc. Each user may also have user bank accounts 1504 held at one or more corresponding banks 1502 (e.g., User 1 will have a User 1 Bank Account 1504(a) at Bank 1502(a), User 2 will have User 2 Bank Account 1504(b) at Bank 1502(b), etc.), which in turn may be accessed by a corresponding user device (e.g., User 1 Device 1506(a), User 2 Device 1506(b), etc.). In embodiments, functionality may be installed on a bank mobile application, which may access an application programing interface (API) of one or more exchanges. Similarly, each user may (or may not) also maintain a digital client (e.g., User 1 Digital Client 1508(a), User 2 Digital Client 1508(b), etc.), either on their respective user device or in some cases offline, to facilitate access to their respective bank accounts from a user device and/or from a digital client or digital address associated therewith.

The participants may be connected directly and/or indirectly, such as through a data network 1510, as discussed herein. Users of a digital asset exchange may be customers of the digital asset exchange, such as digital asset buyers and/or digital asset sellers. Digital asset buyers may pay fiat (e.g., U.S. Dollars, Euro, Yen, British Pound, Swiss Franc, Canadian Dollar, Australian Dollar, New Zealand Dollar, Kuwaiti Dinar, Bahrain Dinar, Oman Rial, Jordan Dinar, Cayman Island Dollar, South African Rand, Mexican Pesos, Renminbi, to name a few) in exchange for digital assets. Digital asset sellers may exchange digital assets for fiat or other digital assets.

The digital asset exchange computer systems 1512 may track the users' respective digital assets in the one or more exchange digital asset ledger databases 1516 associated with the respective digital asset. For example, respective users' BITCOIN assets available for trading will be tracked in a BITCOIN exchange ledger. In turn, the respective digital assets themselves will be maintained in exchange digital clients that are controlled by the one or more private keys associated with each digital client.

Similarly, the digital asset exchange computer system 1512 will track the users' respective fiat in one or more exchange fiat databases 1518 associated with the respective fiat. For example, respective users' U.S. Dollar assets available for trading will be tracked in a U.S. Dollar exchange ledger. In turn, the respective fiat will be maintained in one or more exchange bank accounts 1522 in respective exchange bank(s) 1520, that are typically held in the name of the digital asset exchange on behalf of its customers. A digital asset exchange may have one or more bank accounts, e.g., bank account 1522, held at one or more banks 1520, such as exchange banks or exchange partner banks, which are banks associated with and/or in partnership with the digital asset exchange. In embodiments, exchanges may access other repositories for fiat currency. An exchange bank account 1522 may be a pass-through account that receives fiat currency deposits from a digital asset buyer and transfers the fiat currency to a digital asset seller. The exchange bank account may hold money in escrow while an exchange transaction is pending. For example, the exchange bank account may hold a digital asset buyer's fiat currency until a digital asset seller transfers digital assets to the buyer, to an exchange, or to an authorized third-party. Upon receipt by the appropriate recipient of the requisite amount of digital assets, the digital asset exchange may authorize the release of the fiat currency to the digital asset seller. In embodiments, an exchange may hold, e.g., as a custodian, fiat in bank accounts and digital assets in digital clients at associated digital asset addresses. In embodiments, instead of using bank accounts, other stable investment instruments such as money market mutual funds, treasury bills, CDs, low risk bonds, to name a few, may be used.

A digital asset exchange may have one or more digital asset exchange computer systems 1512, which can include software running on one or more processors, as discussed herein, as well as computer-readable memory comprising one or more databases. A digital asset exchange can include one or more exchange digital asset clients, e.g., digital asset client 1514. Exchange digital client may be used to store digital assets in one or more denominations from one or more parties to a transaction. In embodiments, the exchange digital clients may store digital assets owned by the digital asset exchange, which may be used when an exchange is a counterparty to an exchange transaction, and which can allow exchange transactions to occur even when a buyer and a seller are not otherwise both available and in agreement on transaction terms. Typically, access to such exchange digital clients is controlled by one or more private keys.

Figure 16:
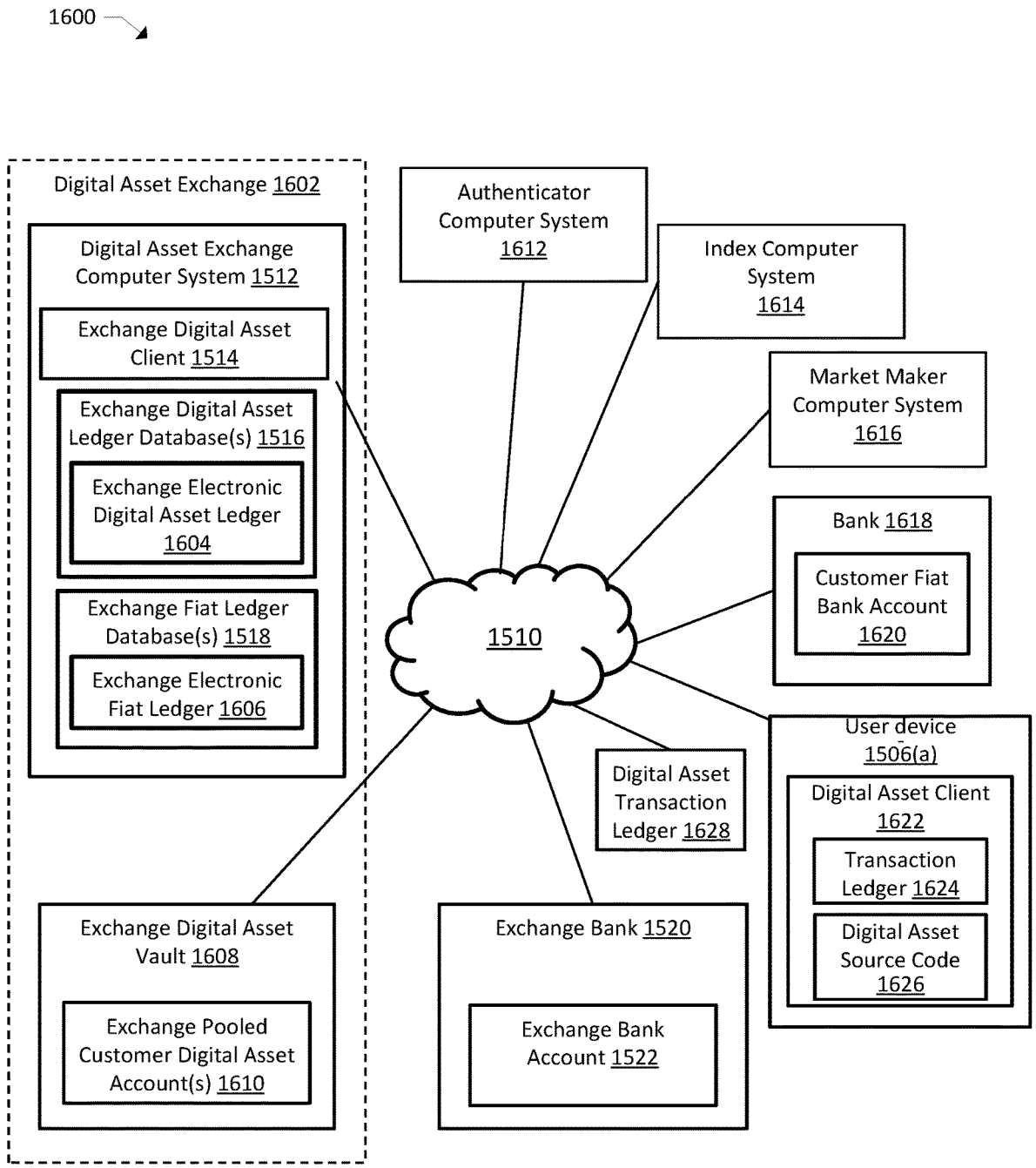
FIG. 16 illustrates a schematic diagram of additional features associated with a digital asset exchange.

FIG. 16 illustrates a schematic diagram of additional features associated with a digital asset exchange. Each entity may operate one or more computer systems. Computer systems may be connected directly or indirectly, such as through a data network (e.g., the Internet, a local area network, a wide area network, a proprietary network, to name a few). The digital asset exchange 1602 may be associated with a digital asset exchange computer system 1512, exchange digital asset clients 1514, for example, associated with one or more digital asset addresses (e.g., BITCOIN clients, ETHEREUM clients, LITECOIN clients, to name a few), customer banks 1618 having customer fiat bank accounts 1620, a digital asset network transaction ledger 1628 (e.g., the BITCOIN blockchain, the ETHEREUM blockchain, the LITECOIN blockchain, to name a few), a digital asset network (e.g., the BITCOIN network, the ETHEREUM network, the LITECOIN network, to name a few), one or more exchange customers using one or more customer user device 1506(*a*), one or more exchange digital asset electronic ledger(s) 1516 one or more exchange digital asset vaults 1608, one or more exchange fiat electronic ledger databases(s) 1518, and one or more exchange partner banks 1520, which can have exchange bank account(s) 1522 for holding pooled customer fiat, to name a few. The exchange digital asset vaults 1608 can store a plurality of digital asset clients, which may be pooled exchange customer digital asset accounts 1610 with associated digital asset addresses. In embodiments, the digital asset exchange 1602 may have one or more partner banks 1520, each with one or more respective exchange bank account(s) 1522. Such account(s) may be associated with insurance protection, such as FDIC insurance protection in the U.S. In embodiments, the digital asset exchange 1602 may also communicate with an authenticator computer system 1612 (to authenticate users, e.g., using multi-factor authentication and/or comparisons to databases of flagged users, to name a few), an index computer system 1614 (e.g., for generating and/or providing a digital asset index, which may be a price index), and/or a market maker computer system 1616, to name a few. A market maker may be an exchange user, like a broker dealer or other entity, that provides liquidity for the digital asset exchange 1602 by purchasing or selling digital assets. The user device 1506(*a*) may include a digital asset client 1622, which may include a transaction ledger 1624 and digital asset source code 1626.

The digital asset exchange 1602 may employ an electronic ledger system to track customer digital assets and/or customer fiat holdings. Such a system may allow rapid electronic transactions among exchange customers and/or between exchange customers and the digital asset exchange 1602 itself using its own digital asset and fiat holdings or those of its sponsor or owner. In embodiments, the electronic ledger system may facilitate rapid computer-based automated trading, which may comprise use by one or more computer systems of a trading API provided by the digital asset exchange 1602. In embodiments, the electronic ledger system may also be used in conjunction with hot client digital asset security systems (e.g., where one or more private keys are maintained on a computer system that is immediately accessible), and/or cold storage digital asset security systems by the digital asset exchange 1602 (e.g., where one or more private keys are maintained on a computer system that is off-line), to name a few. Fiat (e.g., USD) and digital assets (e.g., BITCOIN, ETHER, LITECOIN, to name a few) can be electronically credited and/or electronically debited from respective (e.g., fiat and digital asset) electronic ledgers.

Clearing of transactions may be recorded nearly instantaneously on the electronic ledgers. Deposits of fiat with the digital asset exchange 1602 and withdrawals from the digital asset exchange 1602 may be recorded on the exchange electronic fiat ledger 1606, which may be provided in the exchange electronic fiat ledger database 1518, while deposits and withdrawals of digital assets may be recorded on the exchange electronic digital asset ledger 1604, which may be provided in the exchange digital asset ledger database 1516. Electronic ledgers may be maintained using one or more computers operated by the digital asset exchange 1602, its sponsor and/or agent, and stored on non-transitory computer-readable memory operatively connected to such one or more computers. In embodiments, electronic ledgers can be in the form of a database.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing instructions that, when executed by the one or more processors, cause the one or more processors to perform operations comprising:
generating validator pods associated with cryptocurrency staking validation, individual ones of the validator pods including multiple validator nodes configured to validate proof of stake operations associated with a cryptocurrency transaction;
generating validator keys configured to be utilized by the validator pods for validating the proof of stake operations;
assigning subsets of the validator keys to the validator pods such that each of the validator pods includes at least a threshold number of validator keys;
receiving a request to perform the proof of stake operations associated the cryptocurrency transaction;
provisioning, based at least in part on receiving the request, a validator pod of the validator pods to the cryptocurrency transaction for validating proof of stake operations;
determining that the validator pod includes a validator node that is a compliant validator node; and
utilizing the validator node to validate proof of stake operations.

2. The system of claim 1, wherein provisioning the validator pod is performed utilizing an infrastructure-as-code technique such that the validator pod is automatically provisioned along with compute resources and service configurations to validate the proof of stake operations.

3. The system of claim 1, the operations further comprising:
generating a service networking mesh configured to relate the validator nodes to beacon nodes and to relate the beacon nodes to blockchain-related nodes, wherein the blockchain-related nodes are configured to communicate with the beacon nodes as an entry point into a validator-as-a-service framework operated by the system, and the beacon nodes are configured to communicate with the validator nodes to validate the proof of stake operations; and
parsing the service networking mesh based at least in part on a network associated with a blockchain of the cryptocurrency transaction, the parsing resulting in selection of a beacon node of the beacon nodes, and wherein the validator node is selected based at least in part on the beacon node that was selected.

4. The system of claim 1, the operations further comprising:
determining a namespace associated with the validator pod;
determining groups of computing resources associated with the namespace; and
provisioning the groups of computing resources in association with the provisioning of the validator pod.

5. The system of claim 1, the operations further comprising:
determining a server running the validator pod;
determining that performance metrics of the server satisfy one or more performance thresholds associated with available computing resources and ability to communicate with a network associated with the cryptocurrency transaction; and
wherein determining that the validator pod includes the at least one of the validator nodes that is a compliant validator node is based at least in part on the performance metrics satisfying the one or more performance thresholds.

6. The system of claim 1, the operations further comprising determining to select a different validator node from the validator node based at least in part on at least one of:
detection of node bootstrapping; or
temporary loss of communication between one or more dependent services and the system.

7. The system of claim 1, wherein:
the request is received via a staking application programming interface (API) specific to a blockchain associated with the cryptocurrency transaction; and
provisioning the validator pod is performed utilizing an allocations API that is segregated from the staking API.

8. The system of claim 1, the operations further comprising:
determining an unreserved encryption key available to the validator node;
causing the unreserved encryption key to transition to a reserved encryption key based at least in part on provisioning the validator pod; and
causing the validator node to utilize the reserved encryption key when validating the proof of stake operations.

9. A method comprising:
generating, by a cryptocurrency staking validation system, validator pods associated with cryptocurrency staking validation, individual ones of the validator pods including multiple validator nodes configured to validate proof of stake operations associated with a cryptocurrency transaction;
generating, by a cryptocurrency staking validation system, validator keys configured to be utilized by the validator pods for validating the proof of stake operations;
assigning subsets of the validator keys to the validator pods such that each of the validator pods includes at least a threshold number of validator keys;
receiving, by a cryptocurrency staking validation system, a request to perform the proof of stake operations associated the cryptocurrency transaction;
provisioning, based at least in part on receiving the request and by a cryptocurrency staking validation system, a validator pod of the validator pods to the cryptocurrency transaction for validating proof of stake operations;
determining, by a cryptocurrency staking validation system, that the validator pod includes at least one of the validator nodes that is a compliant validator node; and
utilizing the validator node to validate proof of stake operations.

10. The method of claim 9, wherein provisioning the validator pod is performed utilizing an infrastructure-as-code technique such that the validator pod is automatically provisioned along with compute resources and service configurations to validate the proof of stake operations.

11. The method of claim 9, further comprising:
generating a service networking mesh configured to relate the validator nodes to one or more beacon nodes and to relate the beacon nodes to one or more blockchain-related nodes, wherein the blockchain-related nodes are configured to communicate with the beacon nodes as an entry point into a validator-as-a-service framework operated by the cryptocurrency staking validation system, and the beacon nodes are configured to communicate with the validator nodes to validate the proof of stake operations; and
parsing the service networking mesh based at least in part on a network associated with a blockchain of the cryptocurrency transaction, the parsing resulting in selection of a beacon node of the beacon nodes, and wherein the validator node is selected based at least in part on the beacon node that was selected.

12. The method of claim 9, further comprising:
determining a namespace associated with the validator pod;
determining groups of computing resources associated with the namespace; and
provisioning the groups of computing resources in association with the provisioning of the validator pod.

13. The method of claim 9, further comprising:
determining a server running the validator pod;
determining that performance metrics of the server satisfy one or more performance thresholds associated with available computing resources and ability to communicate with a network associated with the cryptocurrency transaction; and
wherein determining that the validator pod includes the at least one of the validator nodes that is a compliant validator node is based at least in part on the performance metrics satisfying the one or more performance thresholds.

14. The method of claim 9, further comprising determining to select a different validator node from the validator node based at least in part on at least one of:
detection of node bootstrapping; or
temporary loss of communication between one or more dependent services and the cryptocurrency staking validation system.

15. The method of claim 9, wherein:
the request is received via a staking application programming interface (API) specific to a blockchain associated with the cryptocurrency transaction; and
provisioning the validator pod is performed utilizing an allocations API that is segregated from the staking API.

16. The method of claim 9, further comprising:
determining an unreserved encryption key available to the validator node;
causing the unreserved encryption key to transition to a reserved encryption key based at least in part on provisioning the validator pod; and
causing the validator node to utilize the reserved encryption key when validating the proof of stake operations.

17. A cryptocurrency staking validation system comprising:
one or more processors; and
non-transitory computer-readable media storing instructions that, when executed by the one or more processors, cause the one or more processors to perform operations comprising:
generating validator pods associated with cryptocurrency staking validation, individual ones of the validator pods including multiple validator nodes configured to validate proof of stake operations associated with a cryptocurrency transaction;
generating validator keys configured to be utilized by the validator pods for validating the proof of stake operations;
assigning subsets of the validator keys to the validator pods such that each of the validator pods includes at least a threshold number of validator keys;
receiving a request to perform the proof of stake operations associated the cryptocurrency transaction;
provisioning, based at least in part on receiving the request, a validator pod of the validator pods to the cryptocurrency transaction for validating proof of stake operations;
determining that the validator pod includes at least one of the validator nodes that is a compliant validator node;
utilizing the validator node to validate proof of stake operations; and
receiving a cryptocurrency reward based at least in part on utilizing the validator node to validate proof of stake operations.

18. The cryptocurrency staking validation system of claim 17, wherein provisioning the validator pod is performed utilizing an infrastructure-as-code technique such that the validator pod is automatically provisioned along with compute resources and service configurations to validate the proof of stake operations.

19. The cryptocurrency staking validation system of claim 17, the operations further comprising:
generating a service networking mesh configured to relate the validator nodes to one or more beacon nodes and to relate the beacon nodes to one or more blockchain-related nodes, wherein the blockchain-related nodes are configured to communicate with the beacon nodes as an entry point into a validator-as-a-service framework operated by the system, and the beacon nodes are configured to communicate with the validator nodes to validate the proof of stake operations; and
parsing the service networking mesh based at least in part on a network associated with a blockchain of the cryptocurrency transaction, the parsing resulting in selection of a beacon node of the beacon nodes, and wherein the validator node is selected based at least in part on the beacon node that was selected.

20. The cryptocurrency staking validation system of claim 17, the operations further comprising:
determining a namespace associated with the validator pod;
determining groups of computing resources associated with the namespace; and
provisioning the groups of computing resources in association with the provisioning of the validator pod.

* * * * *